(12) United States Patent
Grossman et al.

(10) Patent No.: US 12,455,761 B2
(45) Date of Patent: Oct. 28, 2025

(54) TECHNIQUES FOR WORKFLOW ANALYSIS AND DESIGN TASK OPTIMIZATION

(71) Applicant: AUTODESK, INC., San Francisco, CA (US)

(72) Inventors: Tovi Grossman, Toronto (CA); George Fitzmaurice, Toronto (CA); Benjamin Lafreniere, Toronto (CA); Juho Kim, Daejeon (KR); Minsuk Chang, Daejeon (KR); Kaveh Hassani, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 393 days.

(21) Appl. No.: 16/705,140

(22) Filed: Dec. 5, 2019

(65) Prior Publication Data
US 2020/0349482 A1 Nov. 5, 2020

Related U.S. Application Data

(60) Provisional application No. 62/842,271, filed on May 2, 2019.

(51) Int. Cl.
*G06Q 10/0633* (2023.01)
*G06F 9/48* (2006.01)
(Continued)

(52) U.S. Cl.
CPC ........ *G06F 9/4881* (2013.01); *G06F 16/9024* (2019.01); *G06F 30/12* (2020.01); *G06N 20/00* (2019.01); *G06Q 10/0633* (2013.01)

(58) Field of Classification Search
CPC .............. G06Q 10/0633; G06N 20/00; G06F 16/9024; G06F 30/12; G06F 9/4881
See application file for complete search history.

(56) References Cited

U.S. PATENT DOCUMENTS 11,354,352 B1 * 6/2022 Keisler ................... G06N 3/04
2003/0004770 A1 1/2003 Miller et al.
(Continued)

OTHER PUBLICATIONS

Akers et al., "Backtracking Events As Indicators of Usability Problems in Creation-Oriented Applications", ACM Transactions on Computer-Human Interaction, DOI 10.1145/2240156.2240164, vol. 19, No. 2, Article 16, Jul. 2012, 40 pages.
(Continued)

*Primary Examiner* — Jerry O'Connor
*Assistant Examiner* — Ayanna Minor
(74) *Attorney, Agent, or Firm* — Artegis Law Group, LLP

(57) ABSTRACT

A W-graph system comprising a server connected with a plurality of clients via a network. Each client/user performs a design task via a design application while the server collects timestamped event data. The server generates a plurality of W-graphs for a plurality of tasks based on the collected event data. Each W-graph comprises one or more representative workflows, each representative workflow comprising at least one merged node representing nodes from different workflows for different users performing the same task. A W-graph for a task selected by the user may be viewed in a W-graph GUI. A user may also select a W-suggest function to have a current workflow for a task analyzed for optimization based on a W-graph generated for the same task. A modified current workflow is generated that highlights user techniques in the current workflow that are less efficient than user techniques in the W-graph.

20 Claims, 17 Drawing Sheets

(51) Int. Cl.
  G06F 16/901 (2019.01)
  G06F 30/12 (2020.01)
  G06N 20/00 (2019.01)

(56) References Cited

U.S. PATENT DOCUMENTS

| | | | |
|---|---|---|---|
| 2007/0055558 | A1 | 3/2007 | Shanahan et al. |
| 2008/0065448 | A1 | 3/2008 | Hull et al. |
| 2008/0312963 | A1* | 12/2008 | Reiner ............ G06Q 10/06398 705/7.42 |
| 2009/0222817 | A1 | 9/2009 | Faatz et al. |
| 2011/0301732 | A1* | 12/2011 | Gao ....................... G16H 50/50 700/96 |
| 2013/0311927 | A1 | 11/2013 | Grossman et al. |
| 2014/0129285 | A1 | 5/2014 | Wu et al. |
| 2014/0257835 | A1 | 9/2014 | Kashyap |
| 2017/0024436 | A1 | 1/2017 | Look et al. |
| 2017/0068816 | A1* | 3/2017 | Cavazos ............... G06F 21/562 |
| 2017/0364843 | A1* | 12/2017 | Haligowski ........ G06Q 10/0633 |
| 2019/0026634 | A1 | 1/2019 | Homeyer et al. |
| 2019/0279114 | A1 | 9/2019 | Deshpande et al. |

OTHER PUBLICATIONS

Aspert et al., "MESH : Measuring Errors Between Surfaces Using the Hausdorff Distance", In Proceedings IEEE International Conference on Multimedia and Expo, vol. 1, Aug. 26-29, 2002, pp. 705-708.

Birant et al., "ST-DBSCAN: An algorithm for clustering spatial-temporal data", Data & Knowledge Engineering, doi:10.1016/j.datak.2006.01.013, vol. 60, No. 1, 2007, pp. 208-221.

Breunig et al., "LOF: Identifying Density-Based Local Outliers", In ACM SIGMOD record, vol. 29. ACM, 2000, pp. 93-104.

Carroll et al., "The Nurnberg Funnel: Designing Minimalist Instruction for Practical Computer Skill", IEEE Transactions on Professional Communication, vol. 33, No. 4, Dec. 1990, pp. 182-187.

Carroll et al., "Paradox of the Active User", In Interfacing Thought: Cognitive Aspects of Human-Computer Interaction, http://dl.acm.org/citation.cfm?id=28446.28451, MIT Press, 1987, pp. 80-111.

Chang et al., "RecipeScape: An Interactive Tool for Analyzing Cooking Instructions at Scale", In Proceedings of the 2018 CHI Conference on Human Factors in Computing Systems, DOI: https://doi.org/10.1145/3173574.3174025, ACM, 451, Apr. 21-26, 2018, pp. 1-12.

Chi et al., "MixT: Automatic Generation of Step-by-Step Mixed Media Tutorials", In Proceedings of the 25th annual ACM symposium on User interface software and technology (UIST '12), ACM, Oct. 7-10, 2012, pp. 93-102.

Denning et al., "MeshFlow: Interactive Visualization of Mesh Construction Sequences", DOI: http://dx.doi.org/10.1145/2010324.1964961, ACM Transactions on Graphics, vol. 30, No. 4, Article 66, Jul. 2011, pp. 66:1-66.8.

Ester et al., "A Density-Based Algorithm for Discovering Clusters in Large Spatial Databases with Noise", In Proceedings of 2nd International Conference on Knowledge Discovery and Data Mining, vol. 96, 1996, pp. 226-231.

Fan et al., "A Point Set Generation Network for 3D Object Reconstruction from a Single Image", In Proceedings of the IEEE conference on computer vision and pattern recognition, 2017, pp. 605-613.

Fernquist et al., "Sketch-Sketch Revolution: An Engaging Tutorial System for Guided Sketching and Application Learning" In Proceedings of the 24th Annual ACM Symposium on User Interface Software and Technology (UIST '11), http://dx.doi.org/10.1145/2047196.2047245, Oct. 16-19, 2011, pp. 373-382.

Fourney et al., "InterTwine: Creating Interapplication Information Scent to Support Coordinated Use of Software", In Proceedings of the 27th Annual ACM Symposium on User Interface Software and Technology (UIST '14), http://dx.doi.org/10.1145/2642918.2647420, Oct. 5-8, 2014, pp. 429-438.

Fourney et al., "Query-Feature Graphs: Bridging User Vocabulary and System Functionality", In Proceedings of the 24th Annual ACM Symposium on User Interface Software and Technology (UIST '11), Oct. 16-19, 2011, pp. 207-216.

Fraser et al., "RePlay: Contextually Presenting Learning Videos Across Software Applications", In Proceedings of the SIGCHI Conference on Human Factors in Computing Systems, https://doi.org/10.1145/3290605.3300527, May 4-9, 2019, pp. 1-13.

Fu et al., "Resolving the paradox of the active user: stable suboptimal performance in interactive tasks", DOI: http://dx.doi.org/10.1016/j.cogsci.2004.03.005, Cognitive Science, vol. 28, No. 6, Nov. 2004, pp. 901-935.

Glassman et al., "Learnersourcing Personalized Hints", In Proceedings of the 19th ACM Conference on Computer-Supported Cooperative Work & Social Computing (CSCW '16), DOI: http://dx.doi.org/10.1145/2818048.2820011, Feb. 27-Mar. 2, 2016, pp. 1626-1636.

Grabler et al., "Generating Photo Manipulation Tutorials by Demonstration", DOI: http://dx.doi.org/10.1145/1531326.1531372, ACM Transactions on Graphics, vol. 28, No. 3, Article 66, Aug. 2009, pp. 66:1-66:9.

Grossman et al., "Strategies for Accelerating On-line Learning of Hotkeys", DOI: http://dx.doi.org/10.1145/1240624.1240865, In Proceedings of the SIGCHI Conference on Human Factors in Computing Systems (CHI '07), Apr. 28-May 3, 2007, pp. 1591-1600.

Grossman et al., "ToolClips: An Investigation of Contextual Video Assistance for Functionality Understanding", In Proceedings of the SIGCHI Conference on Human Factors in Computing Systems (CHI '10), DOI: http://dx.doi.org/10.1145/1753326.1753552, Apr. 10-15, 2010, pp. 1515-1524.

Grossman et al., "A Survey of Software Learnability: Metrics, Methodologies and Guidelines", In Proceedings of the SIGCHI Conference on Human Factors in Computing Systems (CHI '09), DOI:http://dx.doi.org/10.1145/1518701.1518803, Apr. 4-9, 2009, pp. 649-658.

Grossman et al., "Chronicle: Capture, Exploration, and Playback of Document Workflow Histories", In Proceedings of the 23nd annual ACM symposium on User interface software and technology (UIST '10), DOI: http://dx.doi.org/10.1145/1866029.1866054, Oct. 3-6, 2010, pp. 143-152.

Guo, Philip J., "Codeopticon: Real-Time, One-To-Many Human Tutoring for Computer Programming", In Proceedings of the 28th Annual ACM Symposium on User Interface Software & Technology (UIST '15), DOI: http://dx.doi.org/10.1145/2807442.2807469, Nov. 8-11, 2015, pp. 599-608.

Jin et al., "SolveDeep: A System for Supporting Subgoal Learning in Online Math Problem Solving", In Proceedings of the SIGCHI Conference Extended Abstracts on Human Factors in Computing Systems, https://doi.org/10.1145/3290607.3312822, Extended Abstracts, May 4-9, 2019, 8 Pages.

Kim, Juho., "Learnersourcing: Improving Learning with Collective Learner Activity", PhD thesis, Massachusetts Institute of Technology, Sep. 2015, 213 pages.

Kong et al., "Delta: A Tool For Representing and Comparing Workflows", In Proceedings of the SIGCHI Conference on Human Factors in Computing Systems (CHI '12), DOI: http://dx.doi.org/10.1145/2208516.2208549, May 5-10, 2012, pp. 1027-1036.

Lafreniere et al., "Task-Centric Interfaces for Feature-Rich Software", In Proceedings of the 26th Australian Computer-Human Interaction Conference on Designing Futures: The Future of Design (OzCHI '14), DOI:http://dx.doi.org/10.1145/2686612.2686620, Dec. 2-5, 2014, pp. 49-58.

Lafreniere et al., "Community Enhanced Tutorials: Improving Tutorials with Multiple Demonstrations", In Proceedings of the SIGCHI Conference on Human Factors in Computing Systems, ACM CHI 2013, Apr. 27-May 2, 2013, pp. 1779-1788.

Li et al., "GamiCAD: A Gamified Tutorial System for First Time AutoCAD Users", In Proceedings of the 25th Annual ACM Symposium on User Interface Software and Technology (UIST '12), DOI: http://dx.doi.org/10.1145/2380116.2380131, Oct. 7-10, 2012, pp. 103-112.

Li et al., " CADament: A Gamified Multiplayer Software Tutorial System", In Proceedings of the SIGCHI Conference on Human

(56) References Cited

OTHER PUBLICATIONS

Factors in Computing Systems (CHI '14), DOI: http://dx.doi.org/10.1145/2556288.2556954, Apr. 26-May 1, 2014, pp. 3369-3378.

Li et al., "TutorialPlan: Automated Tutorial Generation from CAD Drawings", In Twenty-Third International Joint Conference on Artificial Intelligence, 2013, pp. 2020-2027.

Malacria et al., "Skillometers: Reflective Widgets That Motivate and Help Users to Improve Performance", In Proceedings of the 26th Annual ACM Symposium on User Interface Software and Technology (UIST '13), DOI: http://dx.doi.org/10.1145/2501988.2501996, Oct. 6-9, 2013, pp. 321-330.

Matejka et al., "Ambient Help", In Proceedings of the SIGCHI Conference on Human Factors in Computing Systems, DOI: http://dx.doi.org/10.1145/1978942.1979349, (CHI '11), May 7-12, 2011, pp. 2751-2760.

Matejka et al., "CommunityCommands: Command Recommendations for Software Applications", In Proceedings of the 20th annual ACM symposium on User interface software and technology (UIST '09), DOI: http://dx.doi.org/10.1145/1622176.1622214, Oct. 4-7, 2009, pp. 193-202.

Pongnumkul et al., "Pause-and-Play: Automatically Linking Screencast Video Tutorials with Applications", In Proceedings of the 24th Annual ACM Symposium on User Interface Software and Technology (UIST '11), DOI: http://dx.doi.org/10.1145/2047196.2047213, Oct. 16-19, 2011, pp. 135-144.

Qi et al., "PointNet: Deep Learning on Point Sets for 3D Classification and Segmentation", arXiv:1612.00593, 2016, 19 pages.

Sander et al., "Density-Based Clustering in Spatial Databases: The Algorithm GDBSCAN and Its Applications", Data Mining and Knowledge Discovery 2, vol. 2, 1998, pp. 169-194.

Scarr et al., "Dips and Ceilings: Understanding and Supporting Transitions to Expertise in User Interfaces", In Proceedings of the SIGCHI Conference on Human Factors in Computing Systems (CHI '11), DOI: http://dx.doi.org/10.1145/1978942.1979348, May 7-12, 2011, pp. 2741-2750.

Wang et al., "Leveraging Community-Generated Videos and Command Logs to Classify and Recommend Software Workflows", CHI 2018, https://doi.org/10.1145/3173574.3173859, Apr. 21-26, 2018, pp. 1-13.

Whitehill et al., "A Crowdsourcing Approach to Collecting Tutorial Videos-Toward Personalized Learning-at-Scale", In Proceedings of the Fourth (2017) ACM Conference on Learning@ Scale, DOI: http://dx.doi.org/10.1145/3051457.3053973, Apr. 20-21, 2017, pp. 157-160.

Williams et al., "AXIS: Generating Explanations at Scale with Learnersourcing and Machine Learning", In Proceedings of the Third (2016) ACM Conference on Learning@Scale (L@S '16), DOI: http://dx.doi.org/10.1145/2876034.2876042, Apr. 25-26, 2016, pp. 379-388.

Yan et al., "The PyramidSnapshot Challenge: Understanding student process from visual output of programs", In Proceedings of the 50th ACM Technical Symposium on Computer Science Education (SIGCSEâAZ'19), https://doi.org/10.1145/3287324.3287386, Feb. 27-Mar. 2, 2019, pp. 119-125.

Yang et al., "Towards K-means-friendly Spaces: Simultaneous Deep Learning and Clustering", In Proceedings of the 34th International Conference on Machine Learning, JMLR. org, vol. 70, 2017, pp. 3861-3870.

Yi et al., "A Scalable Active Framework for Region Annotation in 3D Shape Collections", SIGGRAPH Asia (2016), DOI 10.1145/2980179.2980238, ACM Transactions on Graphics, vol. 35, No. 6, Article 210, Nov. 2016, pp. 210:1-210:12.

International Search Report for application No. PCT/US2020/030679 dated Aug. 13, 2020.

Zhang et al., "Collaborative Scientific Workflow Composition as a Service: An Infrastructure Supporting Collaborative Data Analytics Workflow Design and Management", 2016 IEEE 2nd International Conference on Collaboration and Internet Computing, DOI 10.1109/CIC.2016.37, XP033039387, Nov. 1, 2016, pp. 219-228.

Mo et al., "PartNet: A Large-scale Benchmark for Fine-grained and Hierarchical Part-level 3D Object Understanding", XP080990049, arxiv:1812.02713v1, Dec. 6, 2018, pp. 1-23.

Tosta et al., "Improving workflow design by mining reusable tasks", Journal of the Brazilian Computer Society, DOI 10.1186/S13173-015-0035-y, vol. 21, No. 1, XP035552887, ISSN: 0104-6500, Oct. 5, 2015, pp. 1-16.

Non Final Office Action received for U.S. Appl. No. 16/705,133 dated Jun. 15, 2022, 39 pages.

Notice of Allowance received for U.S. Appl. No. 16/705,133 dated Oct. 18, 2022, 19 pages.

Wei et al., "Anomaly Prediction Approach in Business Process Based on Machine Learning", doi:10.13196/j.cims, Apr. 2019, 9 pages.

* cited by examiner

| 200 |
| --- |

| | |
|---|---|
| Username_A | C1_A, S1_A, R1_A; C2_A, S2_A, R2_A; C3_A, S3_A, R3_A... R_A |
| Username_B | C1_B, S1_B, R1_B; C2_B, S2_B, R2_B; C3_B, S3_B, R3_B... R_B |
| Username_C | C1_C, S1_C, R1_C; C2_C, S2_C, R2_C; C3_C, S3_C, R3_C... R_C |
| ... | |

TECHNIQUES FOR WORKFLOW ANALYSIS AND DESIGN TASK OPTIMIZATION

CROSS-REFERENCE TO RELATED APPLICATIONS

This application claims the priority benefit of United States provisional patent application titled, "TECHNIQUES FOR ENCODING CONVERGENCES AND DIVERGENCES ACROSS USERS PERFORMING COMPUTER-BASED TASKS," filed on May 2, 2019 and having Ser. No. 62/842,271. The subject matter of this related application is hereby incorporated herein by reference.

BACKGROUND OF THE INVENTION

Field of the Various Embodiments

The present invention relates generally to computer science and, more specifically, to techniques for workflow analysis and design task optimization.

DESCRIPTION OF THE RELATED ART

Software applications, such as computer-aided design (CAD) applications, are commonly used by architects, engineers, and other design professionals to aid in the creation, modification, analysis, and/or optimization of a design. Among other things, using software applications can substantially increase the productivity of the designer and/or improve the overall quality of a design. For example, a CAD application may be used to construct computer models representing real-world constructs, such as buildings, vehicles, electronic appliances, furniture, and the like. The output of a software application also may include electronic files comprising a three-dimensional (3D) printable design that can be exported to a 3D fabrication device that fabricates a physical product.

Advances in computer and software engineering have significantly increased the number and complexity of commands that may be invoked by users when using software applications, such as CAD applications. In addition, when performing a task using a CAD application (such as designing a model of a chair), most users typically implement the same or similar workflows when performing the same or substantially similar task on a repeated basis. Thus, a given user normally does not explore or implement different workflows when performing a task that the user previously performed. For beginner users, this tendency may result from being focused more on simply trying to understanding the number of and complexity of the different commands available in the CAD application, rather than being focused on determining new workflows for performing a particular task. For more advanced users, this tendency may result from simply relying on "tried and true" workflows that the users already understand and know how to perform. Consequently, both beginner users and advanced users oftentimes end up implementing workflows that are inefficient and sub-optimal for particular tasks, without exploring other possible workflows that may be more effective for those tasks.

Several problems currently exist with conventional systems that provide workflow information to users of CAD applications. First, conventional systems comprising a server machine connected with a plurality of client/user machines may configure the server machine to record commands and resulting state changes (representing changes in a design) for a user when performing various modeling tasks via a CAD application. The data for the recorded commands and design states may be made available to the user or other users. However, determining or comprehending a workflow implemented by a given user by viewing the recorded data, which may comprise unprocessed data, minimally processed data, and/or unstructured data, is quite difficult. Accordingly, data recorded by conventional systems may be of limited use when analyzing and exploring workflows for a particular task and/or trying to optimizing a workflow for a particular task.

In addition, the data for the recorded commands and design states typically comprises a substantial amount of data. Thus, transmitting of the recorded data from the server machine to a client machine typically incurs high costs in terms of network bandwidth consumption and increased network congestion. Further, when received at the client at the client machine, displaying the recorded data effectively on a conventional display monitor also is quite difficult due to the large amount data involved. In particular, the size of a conventional display monitor usually cannot simultaneously display the entirety of the recorded data. Consequently, the user is forced to scroll through the recorded data on the data is displayed on the display monitor in order to view the entirety of the recorded data. Such an approach makes ascertaining or analyzing a workflow based on the recorded data extremely difficult for the user.

As the foregoing illustrates, what is needed in the art are more effective techniques for analyzing and optimizing workflows for CAD applications.

SUMMARY OF THE INVENTION

Various embodiments include a computer-implemented method for analyzing software application workflows. The computer-implemented method includes performing one or more operations to determine at least two nodes, wherein each node included in the at least two nodes is associated with a different user workflow for performing a first task via a design application, and the one or more operations are based on a similarity algorithm that implements one or more machine learning functions. The computer-implemented method also includes generating a first workflow graph for the first task that graphically represents a plurality of user workflows for performing the first task, wherein the first workflow graph includes at least one representative workflow that includes a first merged node that represents the two nodes. The computer-implemented method further includes receiving, via the user interface presented on a client device, a selection of the first task, retrieving, from a database, the first workflow graph for the first task, and causing the first workflow graph to be displayed via the user interface.

At least one technical advantage of the disclosed techniques relative to the prior art is that the disclosed techniques enable a workflow graph to be generated and displayed that provides a graphical representation of multiple workflows implemented by multiple users when performing the same design task. Among other things, the workflow graph provides a summarized illustration of the multiple workflows that allows a user to easily view and comprehend different workflows implemented by other users who have previously performed the same design task. In particular, the workflow graph can illustrate how the different workflows implemented by multiple other users converge with one another (indicating similarities) and diverge from one another (indicating differences). In this manner, a user can explore different workflows not yet implemented or considered by the user when performing a given design task, which allows the user to discover and implement a more effective workflow for the design task. Another technical advantage relative to the prior art is that transmitting a workflow graph between the server machine and client machine involves far less transmitted data, thereby decreasing network bandwidth consumption and congestion, as described above.

Various embodiments include a computer-implemented method for analyzing software application workflows. The computer-implemented method includes receiving, via a user interface presented on a client device, a selection of a first task that is performed via a design application. The computer-implemented also method includes performing one or more operations to determine a first edge and a second edge, wherein the first edge is associated with a first user workflow for performing the first task, the second edge is associated with a first workflow graph that graphically represents a plurality of user workflows for performing the first task, and the one or more operations are based on a similarity algorithm that implements one or more machine learning functions. The computer-implemented method further includes generating a modified first workflow based on a comparison between the first edge and the second edge, and causing the modified first workflow to be displayed via the user interface.

At least one technical advantage of the disclosed techniques relative to the prior art is that a computer device is enabled to generate and display a modified current workflow based on a comparison between a workflow implemented by a current user when performing a design task and a workflow graph that provides a graphical representation of multiple workflows implemented by other users when performing the same design task. In particular, the modified current workflow may indicate one or more user techniques implemented by the current user that are determined to be less efficient than one or more corresponding user techniques implemented by the other users. The current user may then implement the more efficient user techniques when performing the design task in the future. In this manner, the current user may more easily analyze and optimize a workflow for performing a particular design task relative to previous approaches. Another technical advantage relative to the prior art is that transmitting a modified workflow between the server machine and client machine involves far less transmitted data, thereby decreasing network bandwidth consumption and congestion, as described above.

In at least one practical application, the disclosed techniques may be implemented within a company or other enterprise having a server-client architecture. A central server may receive and record command usage data and resulting design states for a plurality of clients (e.g., employees) when performing various design tasks, and generate and provide workflow graphs for the various design tasks. The workflow graphs may be leveraged by the clients to analyze, explore, and/or optimize workflows for performing the various tasks. In at least another practical application, the disclosed techniques may be implemented outside an enterprise via a cloud-based service that implements a cloud server connected to a plurality of clients (e.g., subscribers of the cloud-based service). The cloud server may receive and record command usage data and resulting design states for the plurality of clients when performing various design tasks, and generate and provide workflow graphs for the various design tasks. The workflow graphs may be leveraged by the clients to analyze, explore, and/or optimize workflows for performing the various tasks.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 is a conceptual diagram of an event data table, according to various embodiments;

DETAILED DESCRIPTION

Figure 1:
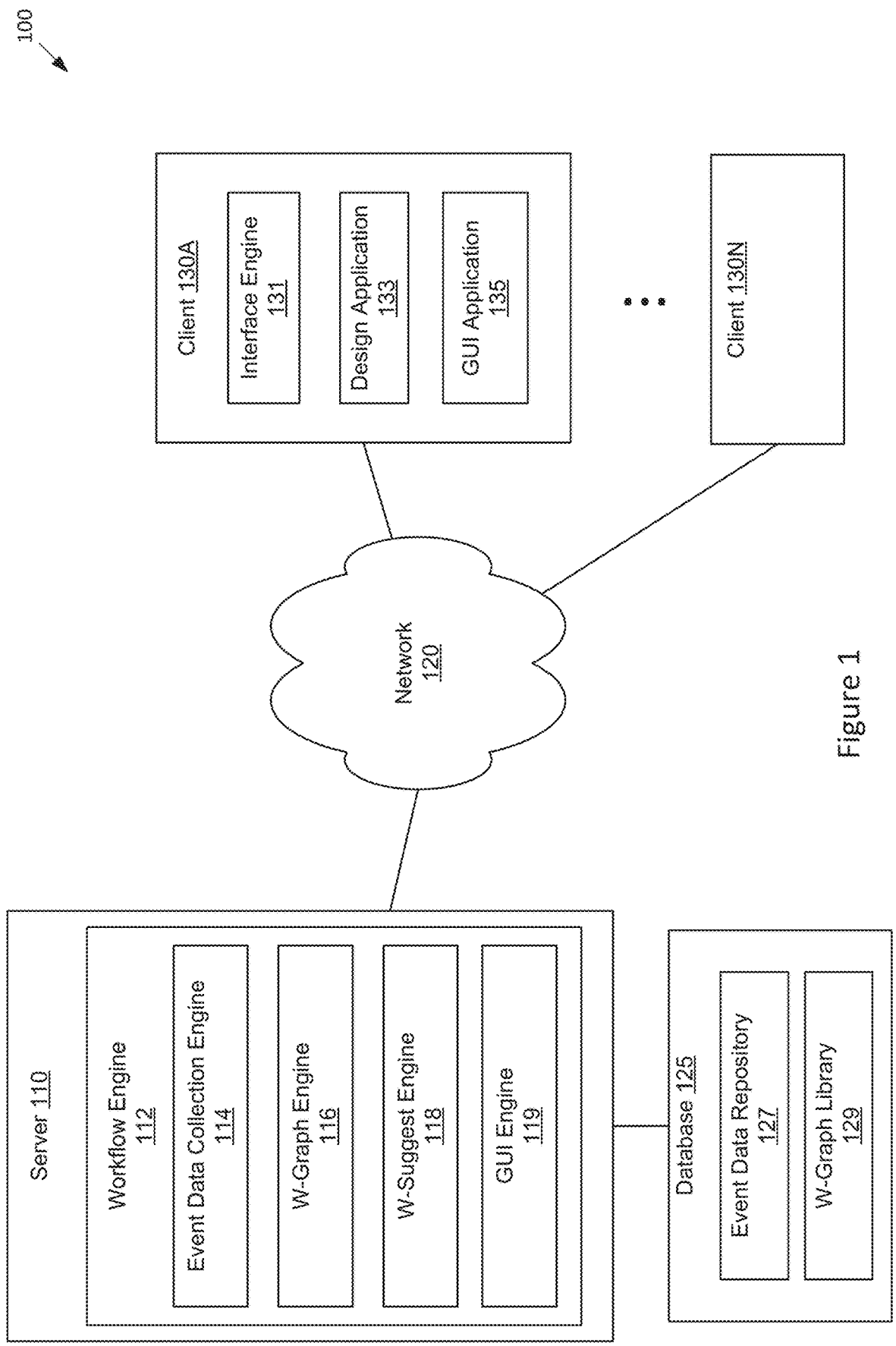
FIG. 1 illustrates a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

As used herein, a "workflow," such as an original workflow and a condensed workflow, may comprise a graphical representation of an overall process implemented by a single user to perform a design task, from a start state (blank design) to an end state (completed design/task). A workflow may comprise a sequence of events, each event comprising an edge and a corresponding node. A workflow may also be considered a set of nodes connected by a set of directed edges from a start node (blank design) to an end node (completed design/task).

As used herein, an "event" may comprise a pairing between an edge (representing a user technique) and a corresponding node (representing a design state produced by the user technique).

As used herein, "event data" may comprise any type of data describing an event or data related to an event. Event data may be collected from various users as the various users perform tasks via the design applications. For example, event data may include command usage data, content snapshots, and screen recordings. Each item of event data may be timestamped.

As used herein, an "edge" may represent a user technique that produces a corresponding state of the design/task, the corresponding state being represented by the corresponding node for the edge. An edge may comprise a directed edge that begins at a previous state/node and ends at a new state/node. Thus, an edge may also represent a change of state from a previous state/node to a new state/node. In an original workflow or condensed workflow, an edge represents a single user technique that causes the change from the previous state/node to the new state/node.

As used herein, a "node" may represent a state or condition of the task, such as the state or condition of a model design. The state of the design/task may be indicated by a content snapshot of the design/task, the content snapshot being associated with the node representing the state.

As used herein, a "user technique" may comprise a particular set/sequence of commands invoked by the user that causes the state of the design/task to change from a first/previous state to a second/new state.

As used herein, an "original workflow" may comprise an initial workflow for a single user prior to combining similar nodes of the workflow.

As used herein, a "condensed workflow" may comprise a workflow for a single user after combining similar nodes of the workflow. A condensed workflow may include a set of combined nodes.

As used herein, a "combined node" may represent two or more similar nodes in the original workflow that are combined into a single combined node. Similar nodes are two or more nodes that represent two or more design/task states that are determined to be similar within a threshold value.

As used herein, a "workflow graph" (W-graph) comprises a graphical representation of multiple workflows for multiple users that performed a same design task. Each W-graph includes one or more representative workflows. In other embodiments, a workflow graph comprises a graphical representation of multiple workflows for the same user that performs a same design task at different times.

As used herein, a "representative workflow" represents a distinct overall process/path from a start state (blank design) to an end state (completed design/task). A representative workflow may comprise an ordered sequence of representative events, each representative event comprising a representative edge and a corresponding representative node. Each representative workflow may comprise at least one merged node that represents a plurality of nodes that originate from a plurality of different workflows for a plurality of different users performing a same task.

As used herein, a "representative edge" in a representative workflow may represent one or more distinct user techniques (one or more distinct sets/sequences of commands) that each produce a same corresponding state of the design/task, the corresponding state being represented by a corresponding representative node for the representative edge.

As used herein, a "representative node" in a representative workflow may comprise an original node, combined node, or a merged node.

As used herein, a "merged node" may represent two or more similar nodes, each similar node originating from a different workflow (original or condensed workflow) for a different user. For example, a first node from a first workflow for a first user may be merged with a second node from a second workflow for a second user to produce a single merged node, wherein the first node and second node are determined to be similar nodes. Similar nodes are two or more nodes that represent two or more design/task states that are determined to be similar within a threshold value.

As used herein, a "table" may comprise any type of data container, such as a data file, document, or the like.

As disclosed in the embodiments herein, a workflow graph (W-graph) system comprises a server connected with a plurality of clients/users via a network. Each client/user executes a design application for performing a particular design task (such as designing a 3D model of a particular object). The W-graph system operates in three phases: an event data collection phase, a W-graph library building phase, and a runtime phase using a W-graph graphical user interface (GUI) and/or a W-suggest GUI.

During the event data collection phase, the server collects event data for the plurality of clients/users performing/completing different design tasks. For each client/user performing a particular design task, the server may collect event data comprising command data, content snapshots, and screen recordings. Each item of event data may be timestamped.

During the W-graph library building phase, the server generates a plurality of different W-graphs for a plurality of different tasks based on the collected event data. A separate W-graph may be generated for each particular task based on the event data collected from a plurality of clients/users performing the same particular task via the design application. For each user performing the particular task, the server may generate an original workflow that graphically represents the overall process the user implemented to perform/complete the particular task. The original workflow comprises a sequence of events, each event comprising an edge representing a user technique (set of commands) and a corresponding node representing a state of the design/task that results from implementing the user technique. The server may also generate a condensed version (condensed workflow) of the original workflow, the condensed workflow including a set of zero or more original nodes and a set of zero or more combined nodes. Each combined node may represent two or more similar nodes from the original workflow. Similar nodes may comprise two or more nodes that represent two or more design/task states that are determined to be similar within a threshold value. The server may further generate the W-graph for the particular task based on a plurality of condensed workflows. The W-graph may include one or more representative workflows. Each representative workflow may comprise at least one merged node that represents a plurality of nodes that originate from a plurality of different workflows for a plurality of different users performing a same task. Each W-graph may be stored to a database for storing the W-graph library.

During the runtime phase using a W-graph GUI, a current user may wish to perform a particular task via a design application and view a W-graph for the particular task prior to performing the task. The server may receive a selection of a particular task via a user interface executing on a current client operated by the current user. In response, the server retrieves the W-graph for the selected task from the W-graph library and causes the W-graph to be displayed at the current client via a W-graph GUI. The current user may interact with the W-graph GUI to request and receive further information related to the W-graph, such as command data information or screen recordings. Advantageously, a W-graph for a task graphically represents multiple different approaches that different users of various experience levels implemented for completing the task, such that the commonalities and differences between the approaches are made easily apparent. Thus, a W-graph allows the current user to easily view and comprehend different workflows implemented by other users who have previously performed the design task, and explore different workflows not previously considered by the current user when subsequently performing the task.

During the runtime phase using a W-suggest GUI, a current user may perform a particular task via a design application and wish to have the overall process implemented by the current user to be analyzed for optimization (greater efficiency). In some embodiments, a W-suggest function includes the analysis of a current workflow for a current user performing a task based on a comparison of the current workflow with a W-graph generated for the same task. In these embodiments, the server may receive a selection of the W-suggest function and a particular task via a user interface executing on a current client operated by the current user.

In response, the server generates a current workflow for the current user performing/completing the particular task. The current workflow may comprise a condensed workflow comprising a set of combined nodes. The server also retrieves the W-graph for the selected task from the W-graph library, the W-graph comprising one or more representative workflows for performing the task. The server determines a primary representative workflow within the W-graph comprising the shortest (most efficient) representative workflow within the W-graph. In other embodiments, the server determines a primary representative workflow within the W-graph comprising the most popular, the most commonly used by a particular group (such as machinists), the most unique, or the most advanced representative workflow within the W-graph.

The server then compares the current workflow with the primary representative workflow to designate at least one edge of the current workflow as a highlighted edge. The at least one designated edge represents at least one user technique that is less efficient than a user technique represented by a corresponding representative edge in the primary representative workflow. The current workflow may be modified to highlight the at least one designated edge to have a different appearance than the non-designated edges of the current workflow. The server may then cause the modified current workflow to be displayed at the current client via a W-suggest GUI. The current user may interact with the W-suggest GUI to request and receive further information related to the modified current workflow, such as command data information or screen recordings associated with the highlighted/designated edges.

Advantageously, the modified current workflow may indicate one or more user techniques implemented by the current user that are determined to be less efficient than one or more corresponding user techniques implemented by the other users. The current user may then implement the more efficient user techniques when performing the same task in the future.

W-Graph System

FIG. 1 illustrates a system configured to implement one or more aspects of the various embodiments. As shown, the W-graph system 100 includes a server 110 and a plurality of clients 130 (e.g., 130A-130N) coupled via a network 120. Each client 130 is associated with and corresponds to a particular user who operates the client 130. The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The server 110 may comprise a computing device or machine, such as a server system, desktop computer, laptop computer, or any other type of computing device suitable for practicing various embodiments. The client 130 may comprise a computing device or machine, such as a desktop computer, laptop computer, mobile device, or any other type of computing device suitable for practicing various embodiments. The server 110 and client 130 comprise computer hardware components such as memory for storing software application(s) and data and processors that execute the software application(s) to provide processing engines that enable the operations and functions described herein. The computer hardware components of the server 110 and client 130 are discussed below in relation to FIGS. 16-17.

The server 110 executes a workflow engine 112 for performing embodiments herein. The workflow engine 112 may include an event data collection engine 114, a W-graph engine 116, a W-suggest engine 118, and a GUI engine 119. The server 110 may be connected to a database 125 that stores a repository of event data 127 received from the clients 130 and a library of W-graphs 129. Each client 130 executes an interface engine 131, a design application 133, and a GUI application 135.

During a data collection phase, the event data collection engine 114 may interact with the clients 130 for receiving and storing event data 127 to the database 125. The event data 127 may comprise data collected from the clients 130 as users operating the clients 130 perform tasks via the design applications 133. The tasks may include any type of design or modeling task, such as designing a two-dimensional (2D) or three-dimensional (3D) model of a particular object (such as a desk, coffee mug, vehicle, appliance, etc.). Collected event data may include command usage data, content snapshots, and screen recordings.

During a W-graph library building phase, the W-graph engine 116 automatically and autonomously (e.g., without human intervention) generates a plurality of different W-graphs for a plurality of different tasks based on the collected event data 127. A separate W-graph may be generated for each specific task based on the collected event data 127.

During a runtime phase implementing a W-graph GUI, the GUI engine 119 interacts with the GUI application 135 executing on the client 130. For example, the GUI engine 119 may receive a user selection of a particular task via the GUI application 135. In response, the GUI engine 119 may retrieve a W-graph corresponding to the selected task from the W-graph library 129 stored to the database 125. The GUI engine 119 then transmits the W-graph to the client 130 to cause the W-graph to be displayed within a W-graph GUI displayed by the GUI application 135.

During a runtime phase implementing a W-suggest GUI, the GUI engine 119 also interacts with the GUI application 135 executing on the client 130. For example, the GUI engine 119 may receive a user selection of the W-suggest feature and a particular task via the GUI application 135. In response, the GUI engine 119 may cause the W-suggest engine 118 to generate a modified current workflow for the current user corresponding to the selected task. The GUI engine 119 then transmits the modified current workflow to the client 130 to cause the modified current workflow to be displayed within a W-suggest GUI displayed by the GUI application 135.

Each client/user 130 executes the design application 133 for performing a particular design task, such as designing a 3D model of a particular object (such as a chair, desk, coffee mug, etc.). The design application 133 may comprise any type of computer-based software application or suite. For example, the design application 133 may comprise any type of design and/or engineering-based applications, such as a computer-aided design (CAD) application, computer-aided engineering (CAE) application, simulator application, modeler application, geometry generator application, a software engineering suite, or the like.

Each client/user 130 also executes an interface engine 131. The interface engine 131 may act as an interface between the workflow engine 112 executing on the server 110 and the design application 133 and GUI application 135 executing on the client 130 to perform embodiments described herein. For example, during the event data collection phase, the interface engine 131 may generate event data as the user performs a particular task via the design application 133, and transmit the event data to the event data collection engine 114 of the workflow engine 112 via the network 120. Each item of event data may be timestamped. For example, the interface engine 131 may generate command event data describing commands being executed on the design application 133, and content snapshots of the state of the design/task resulting from the executed commands. The interface engine 131 may further generate a video screen recording of the design application 133 of the user performing the task, from the start of the task to the completion of the task. Each event data item may be timestamped and transmitted to the event data collection engine 114 of the workflow engine 112.

During the runtime phase, the GUI application 135 may interact with the workflow engine 112 via the network 120 for sending user inputs received via the GUI application 135 to the workflow engine 112 and receiving responses from the workflow engine 112. The GUI application 135 may generate and display a W-graph GUI and/or a W-suggest GUI.

During the runtime phase implementing the W-graph GUI, the GUI application 135 may send a user selection of a particular task to the workflow engine 112 and receive a W-graph corresponding to the selected task from the workflow engine 112. The GUI application 135 may display the received W-graph within a W-graph GUI. The user may also interact with the W-graph GUI to request and receive further information related to the displayed W-graph, such as command data information or screen recordings.

During the runtime phase implementing the W-suggest GUI, the GUI application 135 may send user selections of the W-suggest feature and a particular task to the workflow engine 112 and receive a modified current workflow corresponding to the selected task from the workflow engine 112. The GUI application 135 may display the received modified current workflow within a W-suggest GUI. The user may also interact with the W-suggest GUI to request and receive further information related to the displayed modified current workflow, such as command data information or screen recordings.

Event Data Collection Phase

During a data collection phase, the event data collection engine 114 may interact with the clients 130 for receiving and storing event data 127 to the database 125. The event data 127 may comprise data collected from the clients 130 as users operating the clients 130 perform tasks via the design applications 133. The event data collection engine 114 may generate an event data table for each distinct task for storing received all received event data associated with the task. The event data collection engine 114 may store a plurality of different event data tables for a plurality of different tasks to the database 125, the plurality of event data tables comprising a repository of event data 127.

FIG. 2 is a conceptual diagram of an event data table, according to various embodiments. Each event data table 200 may store event data received from clients 130/users while performing/completing a particular task. For each user performing a particular task, an event may comprise a combination of a user technique (set of commands invoked by the user) and a corresponding a design/task state produced by the user technique. Event data may comprise any data related to or describing an event or performance of the task. In some embodiments, event data includes command usage data, content snapshots, and screen recordings. In other embodiments, event data may comprise any other type of data related to or describing an event or performance of the task.

Command usage data may include command log data that indicate what commands were invoked by the user during performance of a task. The command usage data indicates user techniques (sets of commands) implemented by the user to produce changes in the state of the design/task. For each invoked command, the command usage data may specify a unique command identifier (command ID) for the invoked command and a timestamp of when the command was invoked.

A content snapshot may comprise an image of the design state at a particular time point (specified by an associated timestamp) that is produced by a corresponding user technique. The content snapshot may indicate the geometry of a design state resulting from the corresponding user technique. For example, the content snapshot may comprise an image of the geometry of a 3D model of a chair resulting from a particular user technique that is executed by the user. The execution of each user technique may trigger/initiate generation of a content snapshot corresponding to the user technique. For example, at each client 130, the user may execute a user technique (set of commands) via the design application 133, which causes the interface engine 131 to trigger/initiate a content snapshot of the resulting state of the design task in the design application 133. The interface engine 131 may then transmit command usage data describing the user technique (set of commands) and the corresponding content snapshot to the event data collection engine 114. The interface engine 131 may repeat these operations for each user technique executed by the user while performing the task.

The interface engine 131 at each client 130 may further generate a screen recording of the design application 133 of the user performing the task, from the start of the task to the completion of the task. The screen recording may comprise a screen video recording showing user techniques invoked by the user and resulting changes in the state of the design task while performing the task. Upon the user completing the task, the interface engine 131 may then transmit the screen recording to the event data collection engine 114.

Each event data item received by the event data collection engine 114 may be stored to an event data table 200 corresponding to the particular task. As shown, the event data table 200 comprises a plurality of entries 201 (such as 201a, 201b, 201c, etc.), each entry 201 containing event data for a particular user performing the task. In this regard, each entry 201 comprises a username/ID field 210 and an event data field 220. The username 210 may comprise a unique username or identifier for a user (such as username_A, username_B, username_C, etc.). The event data 220 may contain all event data received from the user, such as command usage data (such as C1_A, C2_A, C3_A, etc.), corresponding content snapshots (such as S1_A, S2_A, S3_A, etc.), and a screen recording (such as R_A). The screen recording (such as R_A) may comprise a recording of the performance of the entire task. The screen recording may then be divided into recording segments/subportions (such as R1_A, R2_A, R3_A, etc.), each recording segment/subportion being associated with a particular user technique (set of commands) and corresponding content snapshot. Each item of event data 220 may be timestamped.

Figure 3:
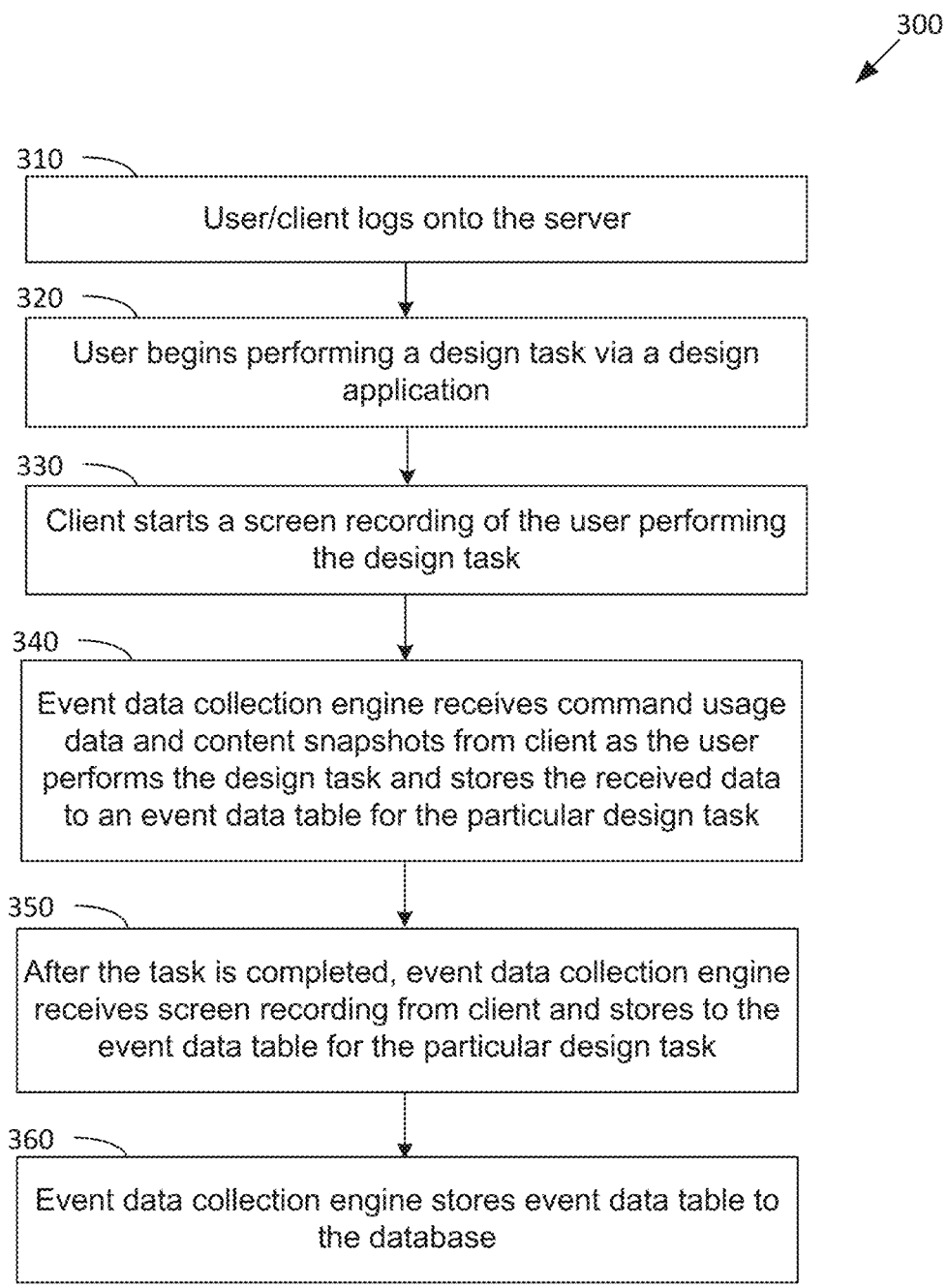
FIG. 3 is a flow diagram of method steps for collecting event data, according to various embodiments.

FIG. 3 is a flow diagram of method steps for collecting event data, according to various embodiments. Although the method steps are described in conjunction with the systems of FIGS. 1-2, persons skilled in the art will understand that the method steps can be performed in any order by any system. In some embodiments, the method 300 may be performed by the server 110 in conjunction with the plurality of clients 130 for receiving and storing event data 127 to the database 125. The method 300 may be implemented for each user performing a particular task via a design application.

The method 300 begins when a client/user 130 logs onto (at step 310) the server 110, e.g., with a username and password. The user begins (at step 320) performing a design task via a design application 133 executing on the client 130. The interface engine 131 may start a screen recording (at step 330) of the user performing the design task via the design application 133. The event data collection engine 114 may receive (at step 340) command usage data and content snapshots from the interface engine 131 as the user performs and completes the design task via the design application 133. The event data collection engine 114 also stores the received command usage data and content snapshots to an event data table 200 for the particular design task. After the task is performed/completed, the event data collection engine 114 receives (at step 350) the screen recording from the interface engine 131 and stores the received screen recording to the event data table 200 for the particular design task. The event data collection engine 114 then stores (at step 360) the event data table 200 to the event data repository 127 stored on the database 125. The method 300 then ends.

W-Graph Library Building Phase

During the W-graph library building phase, the W-graph engine 116 of the server 110 generates a plurality of different W-graphs for a plurality of different tasks based on the collected event data 127. A separate W-graph may be generated for each particular task based on event data collected from a plurality of clients/users performing the same particular task via a design application 133.

Generating each W-graph for a task may comprise 3 separate stages: a pre-processing stage, a node combining stage, and a node merging stage. For a particular task, the W-graph engine 116 performs the pre-processing and node combining stages to generate a condensed workflow for each user performing the particular task. Thus, the pre-processing and node combining stages produces a plurality of condensed workflows representing overall processes implemented by a plurality of users for performing a same task. The W-graph engine 116 may then perform the node merging stage to merge similar nodes across multiple condensed workflows to generate the W-graph for the task. The W-graph comprises a graphical summary of a plurality of workflows for a plurality of users performing the same task.

In the pre-processing stage, the W-graph engine 116 may pre-process event data 127 received for each user performing the task. In particular, the W-graph engine 116 may preprocess the sequence of events for each user using heuristics for collapsing repeated or redundant commands invoked by the user. For example, multiple invocations of an "arrow key" command for moving an object may be collapsed into one "object moved with keyboard" command. As a further example, multiple invocations of a "panning viewpoint" command may be collapsed into one "panning" command. The W-graph engine 116 may then generate an original workflow for each user based on the pre-processed event data. Thus, for the plurality of users performing the particular task, the W-graph engine 116 may generate a set of original workflows, each original workflow graphically representing the overall process a user implemented to perform/complete the particular task. The W-graph engine 116 may further connect the set of original workflows via a common start node (blank design) and a common end node (completed design/task).

Figure 4:
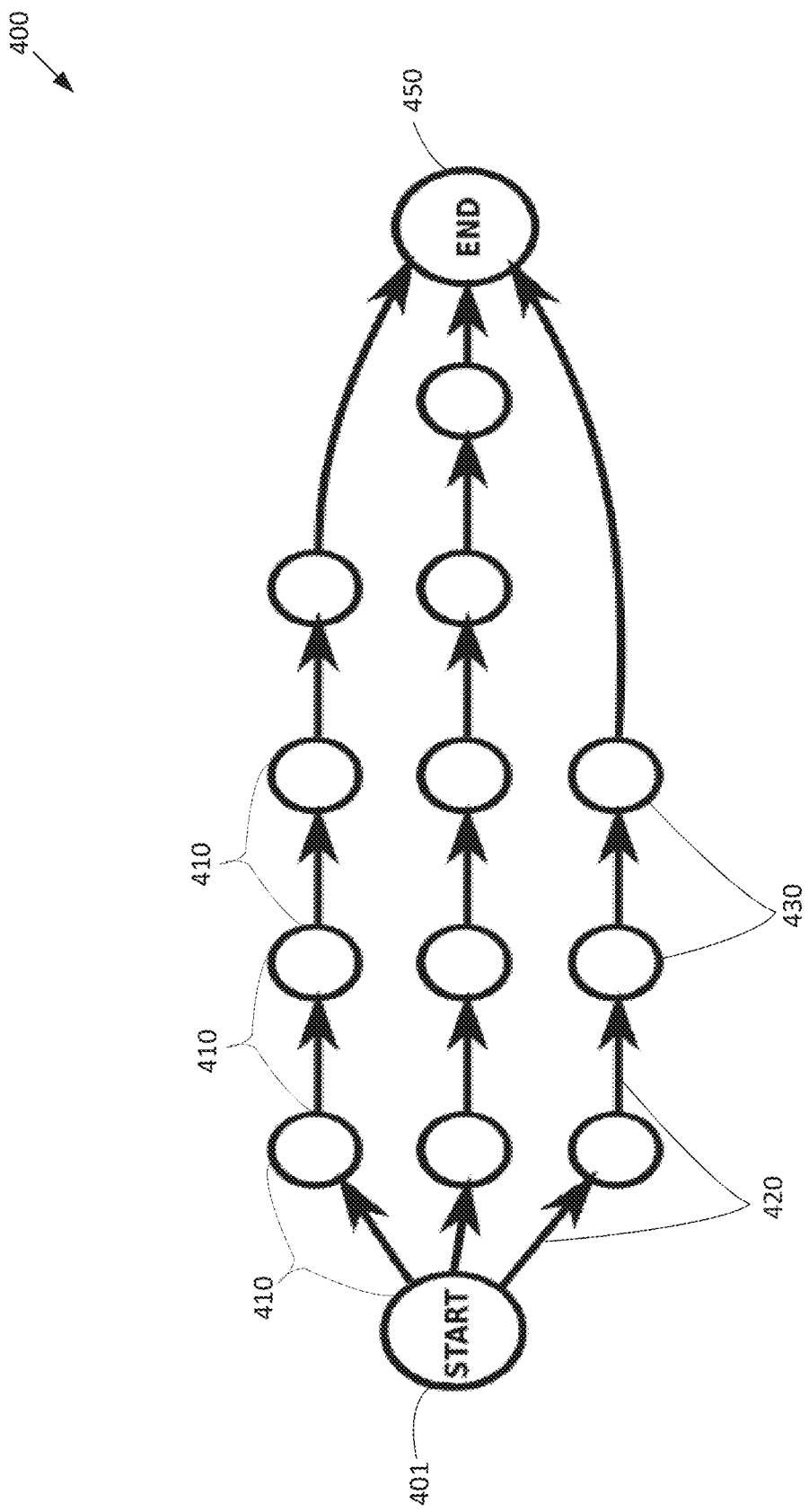
FIG. 4 is a conceptual diagram of a set of original workflows, according to various embodiments.

FIG. 4 is a conceptual diagram of a set of original workflows, according to various embodiments. The set of original workflows 400 comprises a plurality of original workflows that each begin at a common start node 401 (blank design) and finish at a common end node 450 (completed design/task). For illustration purposes, only three original workflows are shown in the example of FIG. 4. However, the set of original workflows 400 would typically contain a large number of original workflows.

Each original workflow comprises an ordered sequence of timestamped events 410 from the start node 401 to the end node 450. Each event 410 is represented by a directed edge 420 and a corresponding node 430. The directed edge 420 is sometimes referred to as an original edge 420 and a node 430 is sometimes referred to as an original node 430. The directed edge 420 represents a user technique (set of invoked commands) and the corresponding node 430 represents a state of the design/task that results from implementing the user technique. As shown, each directed edge 420 points to the corresponding node 430. Each directed edge 420 is associated with timestamped command usage data for the user technique (set of invoked commands). Each corresponding node 430 is associated with a timestamped content snapshot of the design state/task resulting from the user technique. Each original workflow is also associated with a screen recording of the user performing the task from the start state/node 401 to the end state/node 450. As illustrated by the set of original workflows 400, each user may implement a different overall process/approach to perform/complete the particular task.

The W-graph engine 116 may then perform the node combining stage on the set of original workflows 400 to produce a set of condensed workflows. In particular, the W-graph engine 116 may generate a condensed version (condensed workflow) of each original workflow, the condensed workflow comprising a set of zero or more original nodes and a set of zero or more combined nodes. Each combined node may represent two or more similar adjacent nodes from a same original workflow. As the original workflow will typically contain a very large number of nodes, it is advantageous to combine similar nodes into a single combined node for improving processing and storage efficiency. Similar nodes may comprise two or more adjacent nodes in an original workflow that represent two or more design/task states that are determined to be "similar" within a threshold value.

In some embodiments, the similar nodes comprise two or more adjacent nodes in an original workflow that represent two or more design/task states that are determined to have "similar" geometry (within a threshold value) based on the content snapshots associated with the two or more adjacent nodes. In some embodiments, the W-graph engine 116 determines similar nodes for combining into a single combined node by employing a selected similarity metric (and corresponding threshold value) in combination with a data clustering algorithm. Various techniques for determining and defining similarity metrics may be used by the W-graph engine 116, as discussed below. The W-graph engine 116 may implement one such technique to determine a particular similarity metric for two or more adjacent nodes that indicates a level of similarity between the two or more adjacent nodes. The W-graph engine 116 may then determine that the two or more adjacent nodes are "similar" based on a predetermined threshold value. For example, the W-graph engine 116 may determine that the two or more adjacent nodes are "similar" if the determined similarity metric for the two or more adjacent nodes satisfies the predetermined threshold value.

The W-graph engine 116 may also implement a data clustering algorithm to identify clusters of adjacent nodes in the original workflow. The data clustering algorithm then combines adjacent nodes of a same cluster into a combined node based on the determined similarity metric and the predetermined threshold value. In some embodiments, the data clustering algorithm comprises a density-based spatial clustering of applications with noise (DBSCAN) algorithm. In these embodiments, the hyperparameters of the DBSCAN algorithm may be tuned using the K-Nearest Neighborhood distance method. Given a set of points (nodes) in some space, the DBSCAN algorithm clusters together points that are closely packed together (points with many nearby neighbors), while marking as outliers points that lie alone in low-density regions (whose nearest neighbors are too far away).

Figure 5:
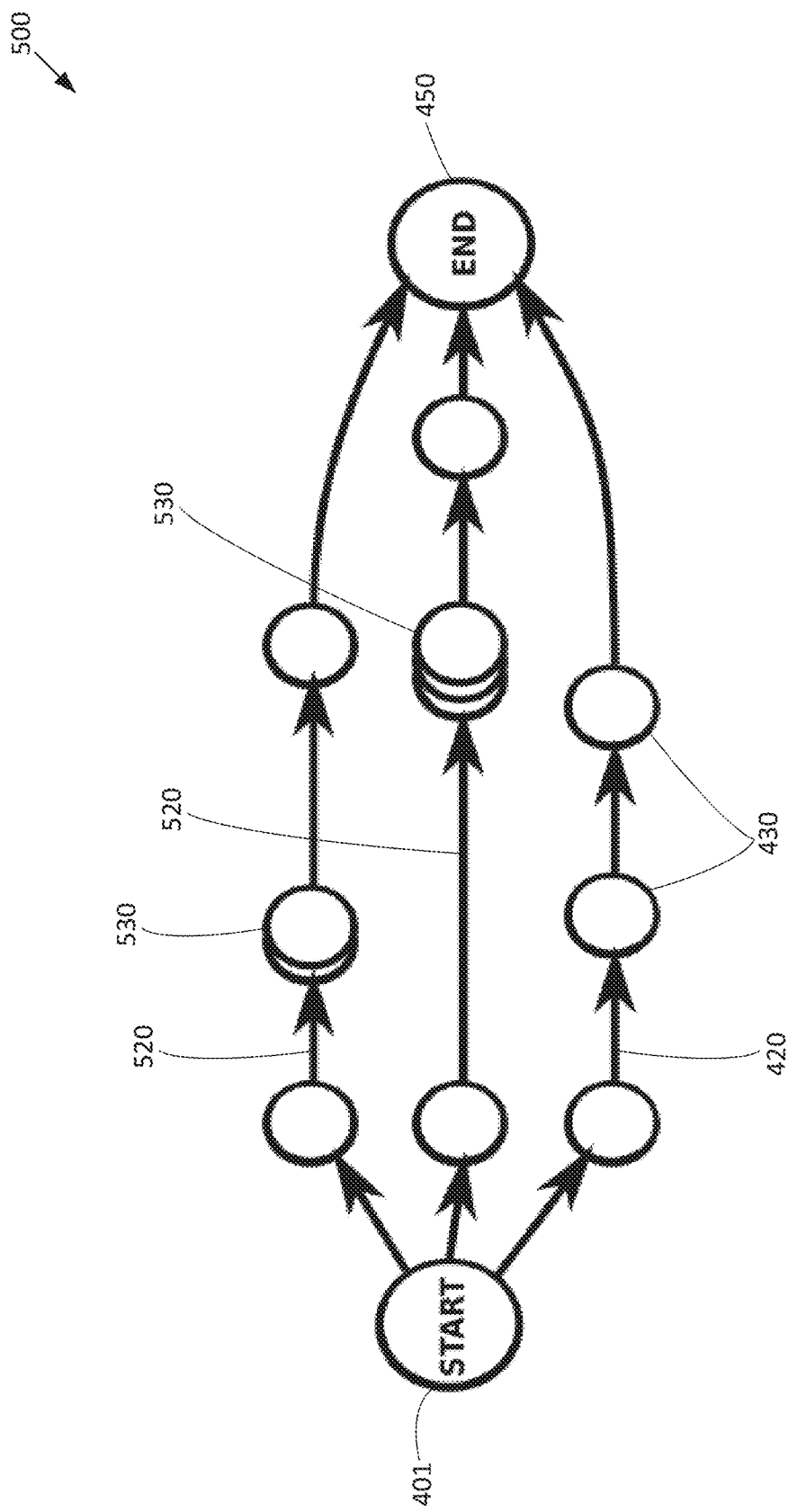
FIG. 5 is a conceptual diagram of a set of connected condensed workflows, according to various embodiments.

After completion of the node combining stage, the W-graph engine 116 has produced a set of condensed workflows. FIG. 5 is a conceptual diagram of a set of connected condensed workflows, according to various embodiments. The set of condensed workflows 500 comprises a plurality of condensed workflows that each begin at a common start node 401 (blank design) and finish at a common end node 450 (completed design/task). For illustration purposes, only three condensed workflows are shown in the example of FIG. 5. However, the set of condensed workflows 500 would typically contain a large number of condensed workflows.

As shown, each condensed workflow comprises a set/sequence of zero or more original nodes 430 and a set/sequence of zero or more combined nodes 530. Note that when a set of original nodes 430 are combined into a single combined node 530, the set of original edges 420 corresponding to the set of original nodes 430 are also combined into a combined edge 520 corresponding to the combined node 530. The combined edge 520 may represent the combination of the user techniques represented by the set of original edges 420. Thus, the combined edge 520 represents the combined sets/sequences of all invoked commands associated with the set of original edges 420. Further, the set/sequence of original nodes 430 includes a final node that is the last original node 430 in the sequence of original nodes 430. The combined node 530 may comprise the final node in the set/sequence of original nodes 430. The combined node 530 is associated with a content snapshot that is associated with the final node. Thus, the combined node 530 represents the final state of the design within the set/sequence of original nodes 430, the final state being illustrated by the content snapshot associated with the final node and combined node 530.

For example, a set of original nodes 430 may comprise an ordered sequence comprising a first original node (with a corresponding first original edge), second original node (with a corresponding second original edge), and third original node (with a corresponding third original edge). The first original edge may represent a first user technique comprising commands c1 and c2, the second original edge may represent a second user technique comprising commands c3 and c4, and the third original edge may represent a third user technique comprising commands c5, c6, and c7. The set of original nodes 430 are combined into a first combined node having a corresponding first combined edge. Thus, the first combined edge represents a first combined user technique comprising commands c1-c7. Also, the first combined node comprises the third original node and is associated with a content snapshot associated with third original node.

After the node combining stage, the W-graph engine 116 may then perform the node merging stage to merge similar nodes across multiple condensed workflows to generate the W-graph for the task. Each merged node may represent two or more similar nodes (original nodes or combined nodes) from two or more different condensed workflows. As in the node combining stage, similar nodes in the node merging stage may also comprise two or more nodes that represent two or more design/task states that are determined to be "similar" within a threshold value.

In some embodiments, the W-graph engine 116 determines similar node pairs for combining into a single merged node by employing a selected similarity metric and corresponding threshold value. Various techniques for determining and defining similarity metrics may be used by the W-graph engine 116, as discussed below. The W-graph engine 116 may implement one such technique to determine a particular similarity metric for node pairs that indicates a level of similarity between the node pairs. The W-graph engine 116 may then determine that the node pairs are "similar" based on a predetermined threshold value and the content snapshots associated with the node pairs. For example, the W-graph engine 116 may determine that the node pair is "similar" if the determined similarity metric for the node pair satisfies the predetermined threshold value. In the node merging stage, the W-graph engine 116 may analyze the condensed workflows by processing pairs of nodes from two different condensed workflows. Therefore, in the node merging stage, the W-graph engine 116 may not require a data clustering algorithm for clustering groups of nodes. However, a merged node may then be merged with yet another node from another workflow in later processing. Thus, a merged node may represent two or more similar nodes.

Figure 6:
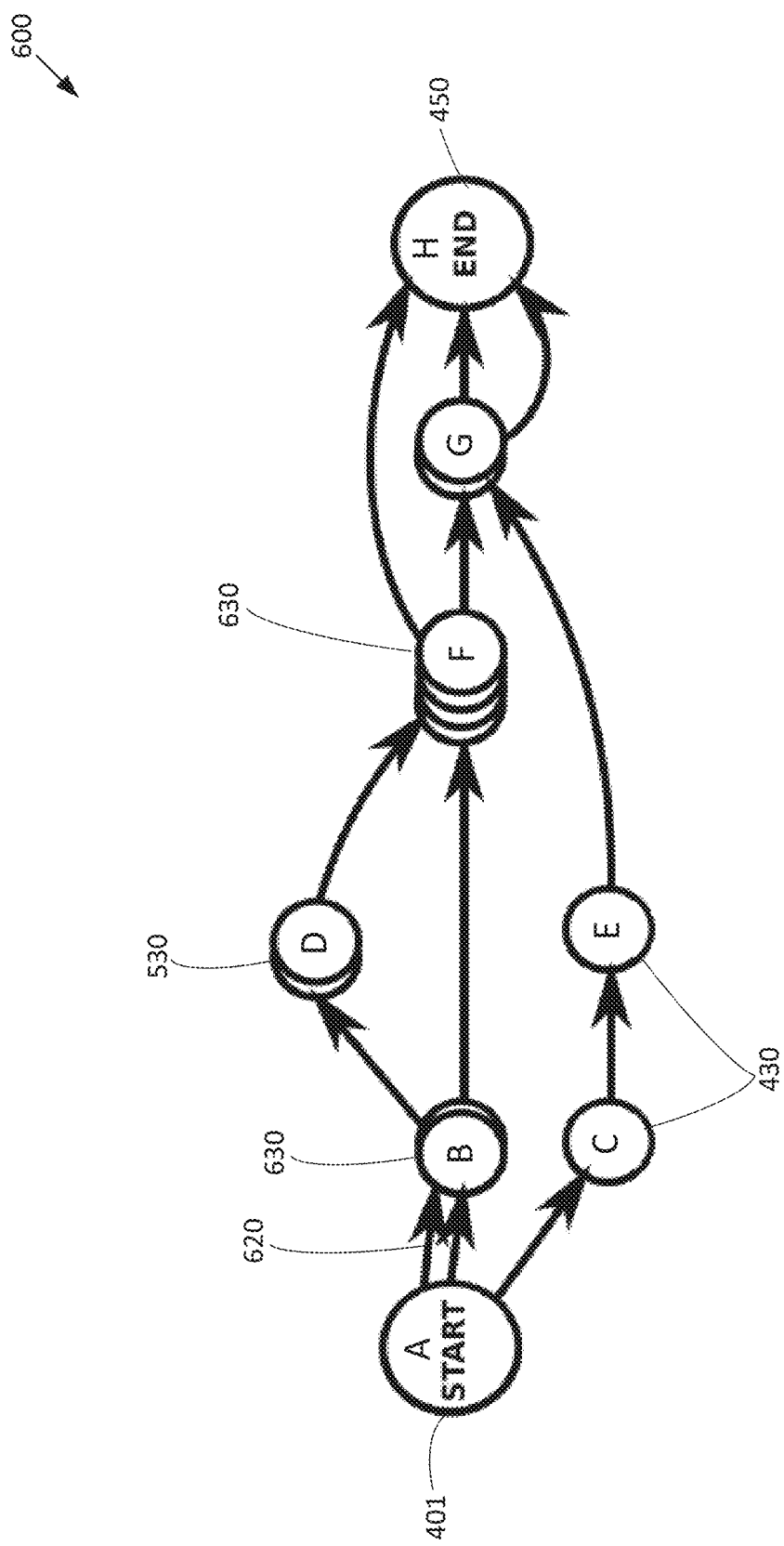
FIG. 6 is a conceptual diagram of a W-graph for completing particular task, according to various embodiments.

After completion of the node merging stage, the W-graph engine 116 has produced a W-graph for the task. FIG. 6 is a conceptual diagram of a W-graph for completing particular task, according to various embodiments. The W-graph 600 that graphical represents a plurality of workflows for a plurality of users performing the same task.

The W-graph 600 may comprise one or more representative workflows. Each representative workflow begins at a common start node 401 (blank design) and finish at a common end node 450 (completed design/task). Each representative workflow represents a unique/distinct overall path from the start node 401 to the end node 450. Each representative workflow may be specified as a distinct sequence of nodes/states from the start node 401 to the end node 450. In this regard, each node in the W-graph 600 may be associated with a label, such as A, B, C, D, and so forth. Each representative workflow may then be defined as a distinct sequence of labeled nodes/states that uniquely identifies the representative workflow from other representative workflows in the W-graph 600. In the example of FIG. 6, the W-graph 600 includes a first representative workflow specified as A, B, D, F, and H; a second representative workflow specified as A, B, D, F, G, and H; a third representative workflow specified as A, B, F, and H; a fourth representative workflow specified as A, B, F, G, and H; and a fifth representative workflow specified as A, C, E, G, and H.

As shown, each representative workflow may comprise a set of zero or more of original nodes 430, a set of zero or more of combined nodes 530, and a set of zero or more of merged nodes 630. A merged node 630 may represent a set of two or more similar nodes, each similar node originating from a different condensed workflow for a different user. Each merged node 630 has a corresponding merged edge 620. Note that when a set of nodes are combined into a single merged node 630, the corresponding merged edge 620 represents the set of edges corresponding to the set of nodes. The set of edges represents a set of user techniques, wherein some user techniques in the set of user techniques may be unique/distinct and some user techniques may be the same. The merged edge 620 may represent each distinct user technique (distinct set of commands) in the set of user techniques represented by the set of edges. Thus, the merged edge 620 represents each distinct set/sequence of commands associated with the set of edges. Further, any node in the set of nodes may be selected as the merged node 630. The merged node 630 is then associated with a content snapshot that is associated with the selected node.

For example, a set of nodes may comprise first node (with a corresponding first edge) from a first condensed workflow, a second node (with a corresponding second edge) from a second condensed workflow, and a third node (with a corresponding third edge) from a third condensed workflow. The first edge may represent a first user technique comprising commands c1 and c2, the second edge may represent a second user technique comprising commands c1 and c2, and the third edge may represent a third user technique comprising commands c2 and c3. The set of nodes are merged into a first merged node having a corresponding first merged edge. Thus, the first merged edge represents two separate and distinct user techniques comprising the first user technique (commands c1 and c2) and the third user technique (commands c2 and c3). Since the second user technique (commands c1 and c2) is the same as the first user technique (commands c1 and c2), the second user technique is not represented by the first merged edge. Note that the two distinct user techniques comprising the first user technique and the third user technique each produce the same change in the design state (as represented by the first merged node).

In this regard, each edge in the W-graph 600 may have an associated user technique counter that counts each distinct user technique represented by the edge. In this example, the first merged edge would have a user technique counter equal to two, since the first merged edge represents two distinct user techniques. An edge that is not a merged edge 630 in the W-graph 600 has a default user technique counter equal to one, as a non-merged edge (original edge or combined edge) only represents a single distinct user technique. Also, the first, second, or third node may be selected as the first merged node, which is associated with a content snapshot associated with the selected node.

Each representative workflow in the W-graph 600 may be further characterized as a sequence of representative events from the start node 401 to the end node 450, each representative event comprises a representative edge and corresponding representative node. A representative edge may comprise an original edge 420, a combined edge 520, or a merged edge 620. A representative edge represents one or more user techniques (sets of commands) that cause the state of the design task to change from a previous state to a new state. If the representative edge comprises an original edge 420 or a combined edge 520, the representative edge represents a single user technique (set of commands). If the representative edge comprises a merged edge 620, the representative edge may represent one or more different/distinct user techniques (one or more different/distinct sets of commands) that each result in the same design state (as represented by the corresponding representative node). For example, a first representative edge may represent a first user technique (first set of commands) implemented by a first user and a second user technique (second set of commands) implemented by a second user, each user technique producing a same change from a same previous state to a same new state. A representative node may comprise an original node 430, a combined node 530, or a merged node 630. Each representative node may represent a particular sub-task in the overall task.

After the node merging stage, the W-graph engine 116 stores a W-graph produced for the task to the library of W-graphs 129 in the database 125. The above three stages of processing may be repeated for each design task to generate a plurality of W-graphs for a plurality of tasks that are stored to the database 125. Each W-graph stored to the database 125 may be indexed by the design task for accessing the W-graph in the database 125.

As discussed above, each W-graph may comprise one or more representative workflows. Each representative workflow comprises a sequence of representative events, each representative event comprises a representative edge and corresponding representative node. Each W-graph may comprise a data structure for storing W-graph data that includes data describing the W-graph and the one or more representative workflows, as well as any data associated with the W-graph. For example, the stored W-graph data may include any event data associated with the W-graph. For example, the stored W-graph data may include the ordered sequence of representative events for each representative workflow and the location of any node connections (merged nodes) between the one or more representative workflows. For each representative node, the W-graph data may include a content snapshot associated with the representative node. For each representative edge, the W-graph data may include a user technique counter and one or more sets of commands (user techniques) associated with the representative node.

For each representative edge, the W-graph data may further include one or more screen recordings associated with the representative edge, each screen recording comprising a video recording of a user executing a set of commands (user technique) associated with the representative event. As described above in relation to FIG. 2, event data for a workflow for a user performing a task may include a screen recording of the user performing the task from the start (blank design) to the end (completed design). The screen recording may then be subdivided into recording segments, each recording segment being associated with a particular edge representing a user technique (set of commands). Thus, each recording segment may comprise a video recording of a user executing a particular set of commands (user technique) associated with an edge. In these embodiments, for each representative edge in the W-graph, the W-graph engine 116 may store and associate a separate recording segment for each distinct user technique represented by with the representative edge. For example, if a representative edge represents two distinct user techniques, the W-graph engine 116 may store and associate two recording segments for the representative edge.

Figure 7:
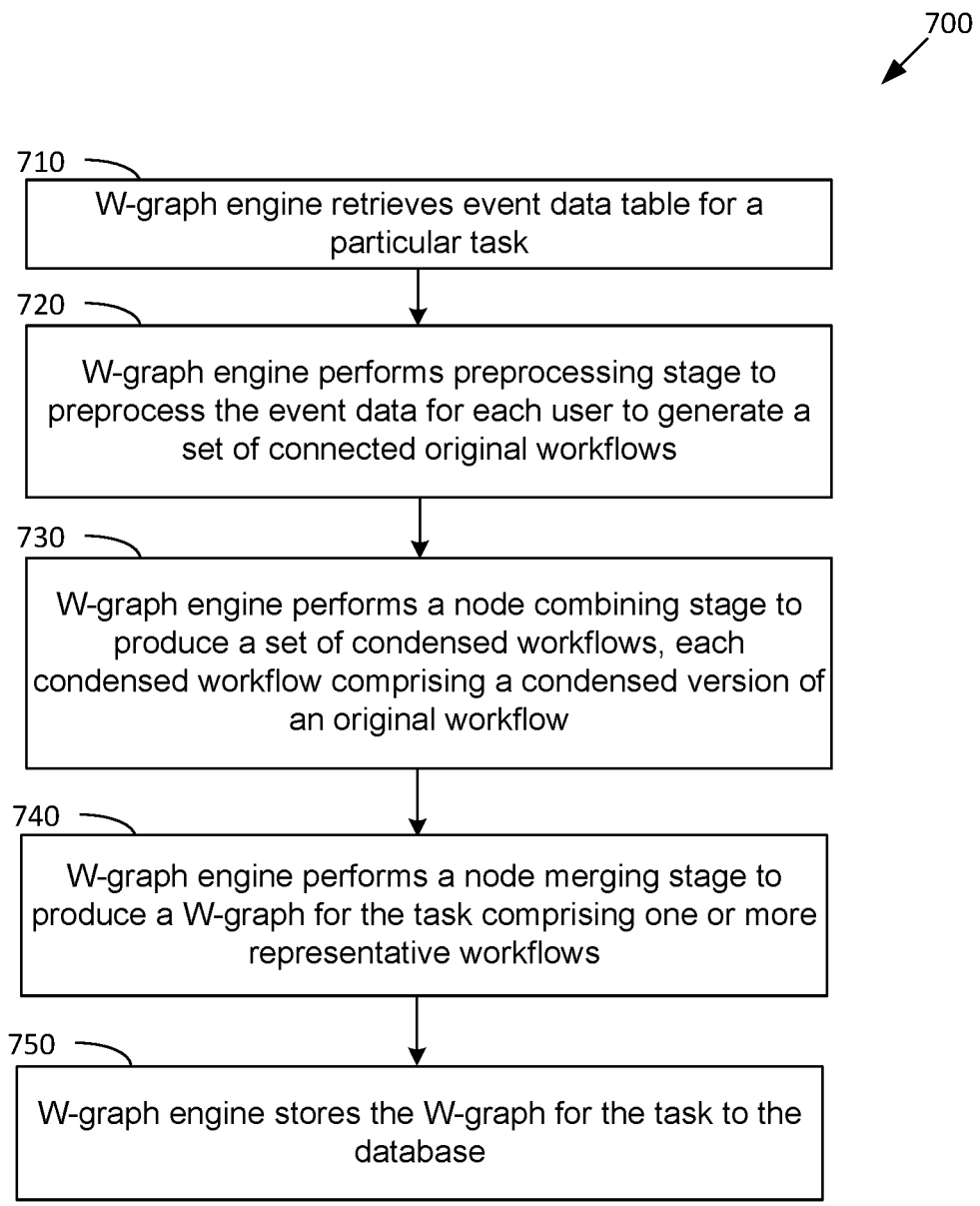
FIG. 7 is a flow diagram of method steps for generating a W-graph for a task, according to various embodiments.

FIG. 7 is a flow diagram of method steps for generating a W-graph for a task, according to various embodiments. Although the method steps are described in conjunction with the systems of FIGS. 1-2 and 4-6, persons skilled in the art will understand that the method steps can be performed in any order by any system. In some embodiments, the method 700 may be performed by the W-graph engine 116 executing on a server 110 connected to a database 125 storing event data 127. The method 700 may be implemented for each distinct design task performed via a design application.

The method 700 begins when the W-graph engine 116 retrieves (at step 710) an event data table 200 storing event data for a particular task. The event data table 200 includes event data for each of a plurality of different users performing the particular task via a design application. The event data for each user may include command data, content snapshots, and screen recordings.

The W-graph engine 116 then performs (at step 720) a preprocessing stage to preprocess the event data for each user to generate an original workflow for each user. In particular, the W-graph engine 116 may collapse repeated or redundant commands invoked by the user to generate an original workflow for each user. Thus, the W-graph engine 116 generates a set of original workflows, each original workflow graphically representing the overall process a user implemented to perform/complete the particular task. Each original workflow may comprise a sequence of original edges and original nodes. The W-graph engine 116 may further connect the set of original workflows via a common start node (blank design) and a common end node (completed design/task)

The W-graph engine 116 then performs (at step 730) a node combining stage to produce a set of condensed workflows, each condensed workflow comprising a condensed version of an original workflow in the set of original workflows. Each condensed workflow may comprise a set of zero or more original nodes and a set of zero or more combined nodes. Each combined node may represent two or more similar adjacent nodes from a same original workflow. Similar nodes may comprise two or more adjacent nodes in an original workflow that represent two or more design/task states that are determined to be "similar" within a threshold value. The W-graph engine 116 may condense each original workflow to generate a condensed workflow by implementing a selected similarity metric (and corresponding threshold value) in combination with a data clustering algorithm (such as the DBSCAN algorithm).

The W-graph engine 116 then performs (at step 740) a node merging stage to produce a W-graph for the task. The W-graph may comprise one or more representative workflows. Each representative workflow may include at least one merged node that represents a plurality of nodes that originate from a plurality of different workflows for a plurality of different users performing a same task. Each representative workflow comprises a distinct sequence of representative events from the start node to the end node, each representative event comprises a representative edge and corresponding representative node. A representative edge may comprise an original edge, a combined edge, or a merged edge. A representative edge represents one or more distinct user techniques (sets of commands) that cause the state of the design task to change from a previous state to a new state. A representative node may comprise an original node, a combined node, or a merged node. Each merged node may represent a set of two or more similar nodes, each similar node originating from a different condensed workflow for a different user. The W-graph engine 116 may determine similar node pairs for merging into a single merged node by employing a selected similarity metric and corresponding threshold value.

The W-graph engine 116 then stores (at step 750) the W-graph for the task to a library of W-graphs 129 stored in the database 125. The W-graph may comprise a data structure for storing W-graph data that includes data describing the W-graph and the one or more representative workflows, as well as any data associated with the W-graph. The method 700 then ends. The W-graph may be indexed in the database 125 by the corresponding design task for later accessing the W-graph in the database 125. The method 700 may be repeated for each task to generate a plurality of W-graphs for a plurality of tasks that are stored to the database 125.

Similarity Techniques and Metrics

As discussed above, in the node combining stage and the node merging stage, two nodes are determined to be "similar" based on a selected similarity metric and corresponding threshold value. Various techniques for determining and defining similarity metrics may be used by the W-graph engine 116 in the node combining and node merging stages. In both stages, the W-graph engine 116 may implement one such technique to determine a particular similarity metric/value for two nodes, the similarity metric/value indicating a level of similarity between the two nodes (i.e., a level of similarity between two content snapshots associated with the two nodes). The W-graph engine 116 may then determine that the two nodes are "similar" based on a predetermined threshold value.

For example, the W-graph engine 116 may determine that two nodes are "similar" if the determined similarity metric/value for the two nodes satisfies the predetermined threshold value (e.g., the similarity metric/value is equal to or greater than the predetermined threshold value or the similarity metric/value is equal to or less than the predetermined threshold value). In these embodiments, two nodes that are determined to be similar indicates that the content snapshots associated with the two nodes are similar within a threshold value. In particular, the content snapshots may include design geometries that are determined to be geometrically or semantically similar within the threshold value. Thus, two nodes determined to be similar may represent semantically similar design states. The criteria for determining which nodes/states are semantically-similar are dependent on the predetermined threshold value, which can be determined and adjusted by the users/designers.

In some embodiments, the similarity algorithm/technique for determining a similarity metric/value for the two nodes comprises an autoencoder algorithm/technique. In general, the autoencoder technique may implement an autoencoder to represent the 3D geometry information of the content snapshots associated with nodes, and then compare the 3D geometry information to detect differences in 3D geometry information. The autoencoder technique implements latent space embedding using autoencoders to define similarity. The autoencoder used to determine the similarity metric may be trained using machine learning techniques. In these embodiments, nodes that are determined to be "similar" nodes for combining into combined nodes and/or merging into merged nodes are determined via machine learning functionality. Thus, in these embodiments, the combined nodes and the merged nodes may be determined via machine learning functionality. Once trained, the autoencoders can generate compact representations (such as 512-dimensional vector) of the input data and compare the compact representations to quantify the similarity between the input data. The input data may comprise 3D point cloud data generated from the content snapshots associated with the nodes.

In machine learning training, the autoencoders learn compact representations of the input data by learning to encode a training set of data to a latent space of smaller dimensions (such as vectors). An autoencoder may comprise a type of artificial neural network used to learn a representation (encoding) for a set of input data for dimensionality reduction by training the network to ignore signal noise. In some embodiments, a latent model is trained with the PointNet autoencoder or a variation of the PointNet autoencoder for encoding 3D point clouds to vectors. The autoencoder is trained on a set of data, such as the ShapeNet dataset comprising 55 common object categories with over 51,000 unique 3D models.

After the autoencoders are trained, two nodes to be compared may be processed using the autoencoders by first generating a 3D point cloud data for the content snapshot (such as a 3D model) associated with each node. The autoencoder is then used to translate 3D point cloud data for each content snapshot into a 512-dimensional vector. The 512-dimensional vectors produced for the content snapshots are then compared using cosine distance to quantify the similarity between the content snapshots.

Selection of the autoencoder technique as the similarity algorithm/technique may be advantageous as the autoencoder technique works using 3D point cloud data. Thus the autoencoder technique is not sensitive to how a 3D model in a content snapshot was produced, and is only sensitive to the final geometry produced. Also, the autoencoder technique may be more sensitive to semantically-meaningful changes to content snapshots than other similarity techniques. Further, the autoencoder technique may require less tuning than other similarity techniques.

In other embodiments, the similarity algorithm/technique for determining a similarity metric/value for the two nodes comprises a tree-comparison technique. The tree-comparison technique may represent the content snapshots (3D models) of the two nodes as constructive solid geometry (CSG) trees. Each CSG tree comprises geometric primitives (e.g., cubes, cylinders, cones) that are combined together using Boolean operations (e.g., union, intersection, difference) in a hierarchical structure. The tree-comparison technique may then quantify the difference between the two content snapshots by directly comparing the respective CSG trees.

Selection of the tree-comparison technique as the similarity technique may be advantageous as the tree-comparison technique may process the two nodes simply and efficiently to determine a similarity metric for the two nodes. However, different procedures for designing/modeling the same resulting geometry in the content snapshots can produce significantly different CSG trees. Thus, the tree-comparison technique may be a less accurate method for judging semantic similarity between states where a similar end-result geometry was reached through distinct processes, as compared to the autoencoder technique.

In other embodiments, the similarity technique for determining a similarity metric/value for the two nodes comprises a mesh-comparison technique. The mesh-comparison technique may use a mesh comparison metric (such as the Hausdorff distance) to compare the 3D meshes of the 3D models in the content snapshots for the two nodes. Selection of the mesh-comparison technique as the similarity technique may be advantageous as the mesh-comparison technique may process the two nodes simply and efficiently to determine a similarity metric for the two nodes. However, the distances produced by the mesh comparison metric are in absolute terms, so that conceptually minor changes to a 3D model may lead to large changes in the distance metric. Further, the mesh-comparison technique may require extensive trial and error to set an appropriate threshold value.

In other embodiments, the similarity technique for determining a similarity metric/value for the two nodes comprises a 2D image-comparison technique. The image-comparison technique may include rendering the geometry of each content snapshot from several different angles (e.g., 20 different angles), and then comparing the resulting 2D images to quantify the difference between the content snapshots. Selection of the image-comparison technique as the similarity technique may be advantageous as the image-comparison technique is not sensitive to how a 3D model in a content snapshot was produced, and is only sensitive to the final geometry produced. However, the image-comparison technique may require extensive trial and error to set an appropriate threshold value.

After the similarity metric/value is determined for the two nodes using the selected similarity technique, the similarity metric/value is then compared to a predetermined threshold value to determine if the two nodes are "similar." Thus, the predetermined threshold value comprises a threshold for semantic similarity between two nodes. The predetermined threshold value may be manually adjusted depending on the level of granularity the user/designer wishes to achieve. For example, the predetermined threshold value may be varied to capture more or less granularity in variations in the different overall processes to perform the task, as reflected in the W-graph generated for the task.

Runtime Phase Using a W-Graph GUI

After the W-graph library 129 is produced, the W-graph library 129 may be leveraged during a runtime phase using a W-graph GUI and/or W-suggest GUI. During the runtime phase using a W-graph GUI, a current user may wish to perform a particular task via a design application and view a W-graph for the particular task prior to performing the task. The W-graph for the task graphically represents multiple different approaches that different users of various experience levels implemented for completing the task, such that the commonalities and differences between the approaches are made easily apparent. Thus, a W-graph allows the current user to easily view and comprehend different workflows implemented by other users who have previously performed the design task, and explore different workflows not previously considered by the current user when subsequently performing the task.

In these embodiments, the GUI engine 119 executing on the server 110 may interact with the GUI application 135 executing on the client 130. For example, the GUI engine 119 may receive a user selection of a particular task via the GUI application 135. In response, the GUI engine 119 may retrieve a W-graph and W-graph data corresponding to the selected task from the W-graph library 129 stored to the database 125. The GUI engine 119 then transmits the W-graph and W-graph data to the client 130, which causes the W-graph and W-graph data to be displayed within a W-graph GUI displayed by the GUI application 135. The W-graph GUI may be generated by the GUI engine 119 and transmitted to the GUI application 135 for display. In other embodiments, the W-graph GUI may be generated and displayed by the GUI application 135 on the client 130. The current user may also interact with the W-graph and W-graph GUI to request and view further information (W-graph data) related to the W-graph, such as command data information and/or screen recordings.

Figure 8:
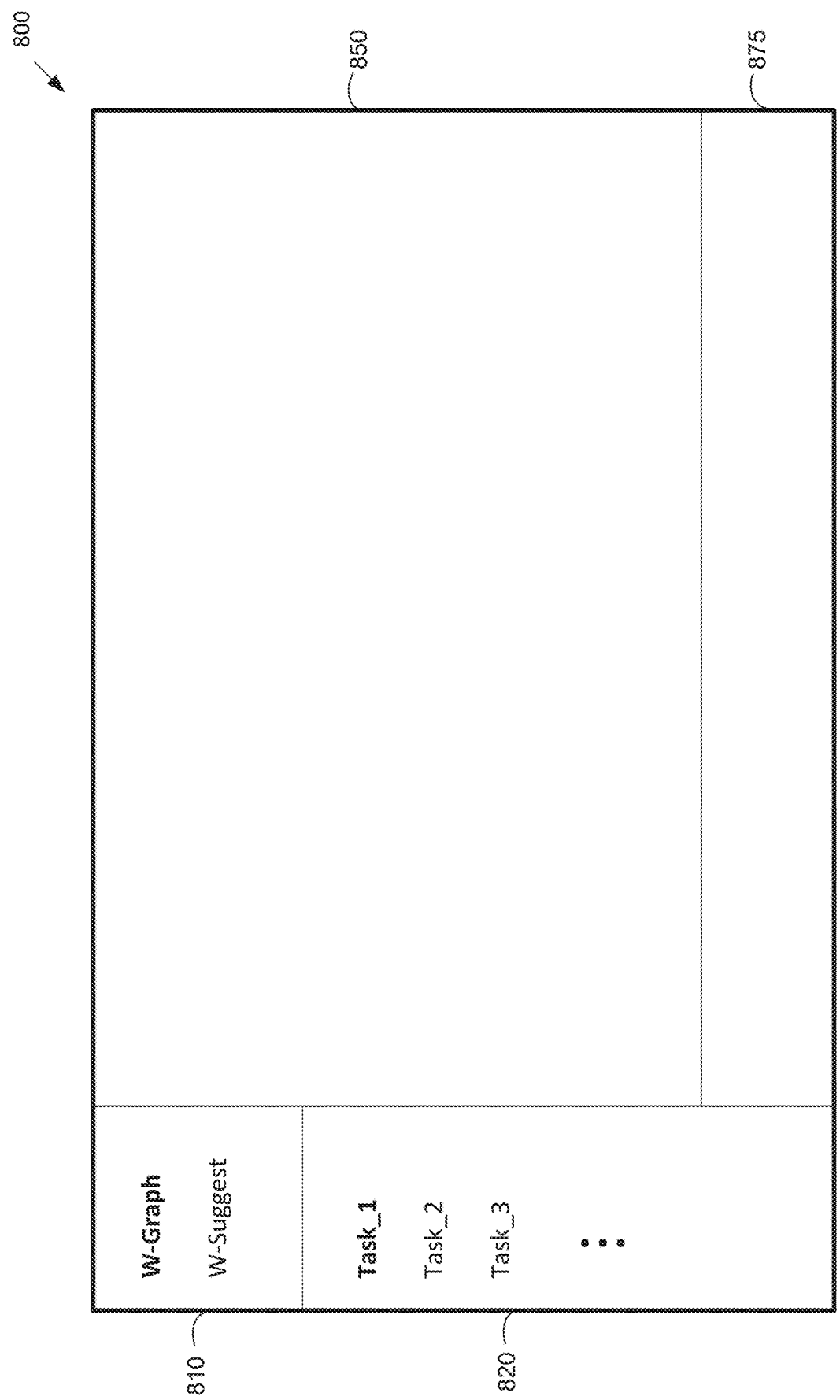
FIG. 8 is a screenshot of a W-graph graphical user interface (GUI) for displaying and interacting with a W-graph, according to various embodiments.

FIG. 8 is a screenshot of a W-graph graphical user interface (GUI) for displaying and interacting with a W-graph, according to various embodiments. The W-graph GUI 800 may include a plurality of sections including a mode selection section 810, a task selection section 820, a W-graph section 850, and a W-graph data section 875.

The mode selection section 810 displays user selectable modes including the W-graph mode and the W-suggest mode. The W-graph mode implements the W-graph GUI discussed in this section. The W-suggest mode implements the W-suggest GUI discussed in the below section. It is assumed a current user has currently selected the W-graph mode, as indicated by the bolded text in FIG. 8. The task selection section 820 displays a plurality of user selectable tasks (e.g., Task_1, Task_2, Task_3, etc.). For example, the selectable tasks may include designing a 3D model of a particular object (such as a chair, desk, coffee mug, etc.). In other embodiments, the selectable tasks may include other designing tasks. The W-graph section 850 displays a W-graph corresponding to a selected task. The W-graph illustrates one or more representative workflows, each representative workflow comprising a sequence of representative edges and representative nodes. The W-graph may include user selectable components, such as selectable representative edges. The W-graph data section 875 may display W-graph data for a selected representative edge, such as compiled metrics, command data, and screen recordings.

For example, the current user may select a first task (Task_1) for designing a 3D model of a chair with four legs, as indicated by the bolded text in FIG. 8. A first W-graph has been previously generated and stored for the first task in the database 125. In response, the GUI application t135 on the client 130 may transmit the selection of the first task to the GUI engine 119 executing on the server 110. In response, the GUI engine 119 may retrieve the first W-graph corresponding to the first task from the W-graph library 129 stored to the database 125. The GUI engine 119 then transmits the first W-graph to the client 130 to cause the first W-graph to be displayed within the W-graph GUI 800.

Figure 9:
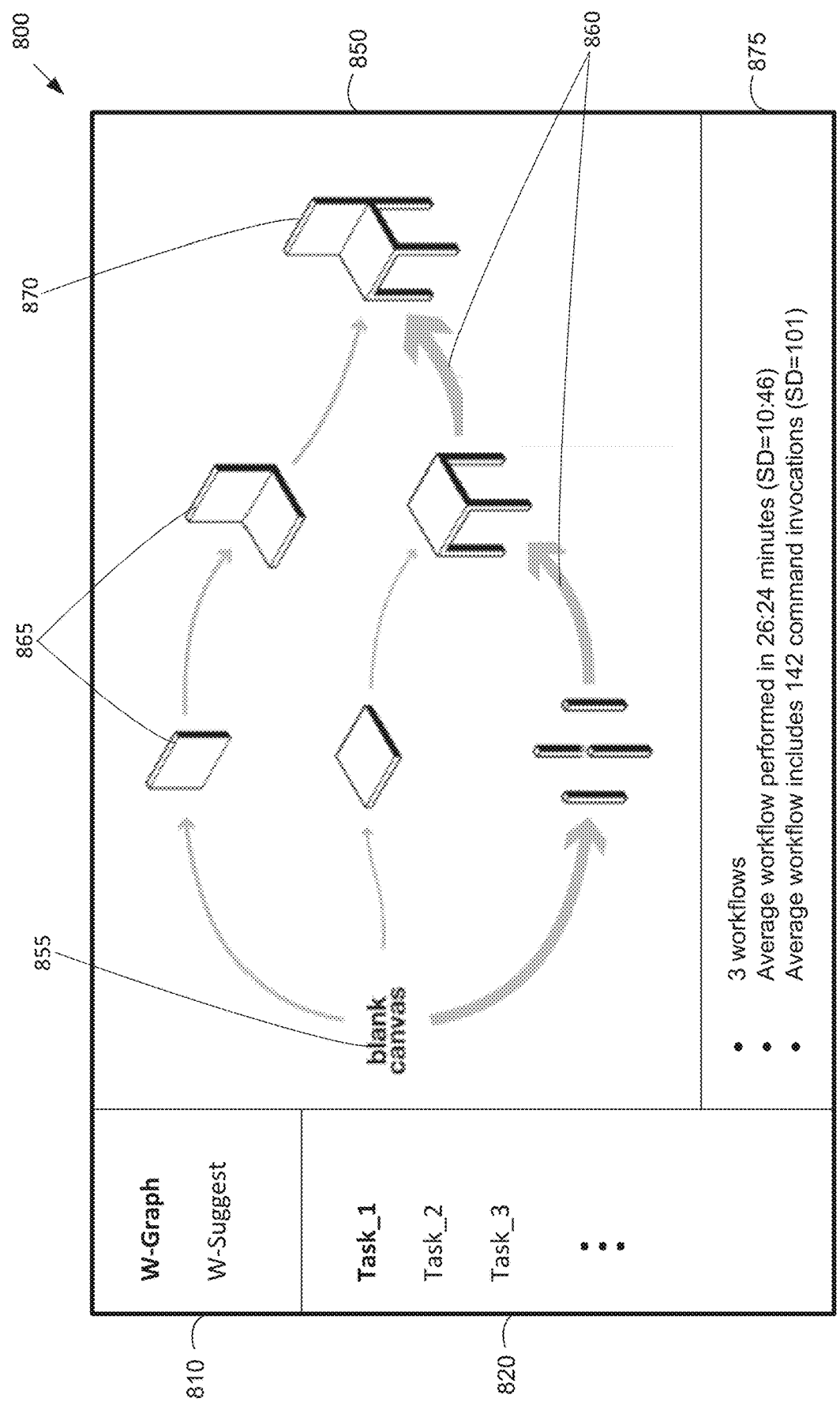
FIG. 9 is a screenshot of a selected W-graph displayed on the W-graph GUI of FIG. 8, according to various embodiments.

FIG. 9 is a screenshot of a selected W-graph displayed on the W-graph GUI of FIG. 8, according to various embodiments. As shown, the first W-graph is received and displayed in the W-graph section 850. The first W-graph illustrates one or more representative workflows, each representative workflow comprising a distinct sequence of representative events from a start node 855 (representing a start state) to an end node 870 (representing the completed first task). Each representative event comprises a representative edge 860 and a representative node 865. Each representative node 865 in the W-graph may be configured to display a content snapshot associated with the representative node 865. As shown in the example of FIG. 9, each representative node 865 displays a content snapshot illustrating the state of the task for designing a chair.

Each representative edge 860 in the W-graph may comprise a user selectable edge. Each representative edge 860 represents one or more distinct user techniques (distinct sets/sequences of commands). In some embodiments, a representative edge 860 is configured with a particular visual appearance based on the number of distinct/unique user techniques that the representative edge 860 represents. For example, the line thickness of the representative edge 860 may vary depending on the number of distinct user techniques that the representative edge 860 represents so that a representative edge 860 representing a greater number of user techniques is displayed with a greater line thickness than another representative edge 860 representing a lesser. For example, a first representative edge 860 may represent a first number of distinct user techniques and a second representative edge 860 may represent a second number of distinct user techniques, the second number being greater than the first number. Thus, the second representative edge 860 may be displayed with a greater line thickness than the first representative edge 860. In other embodiments, a number of distinct user techniques that a representative edge 860 represents is indicated in another manner. For example, a number label may be displayed next to each representative edge 860 that specifies the number of distinct user techniques that a representative edge 860 represents.

In response to the user selection of the first task, the GUI application 135 may also receive W-graph data from the GUI engine 119 describing or related to the first W-graph. In some embodiments, the GUI application 135 receives and displays compiled metrics for the overall W-graph in the W-graph data section 875. As shown, the compiled metrics for the overall W-graph may include metrics such as a total number of distinct representative workflows, an average time for performing the representative workflows with standard deviation (as indicated by the screen recordings), and an average number of invoked commands for performing the representative workflows with standard deviation. In other embodiments, other compiled metrics for the overall W-graph may be displayed in the W-graph data section 875.

The current user may also interact with the W-graph displayed in the W-graph GUI 800 to request and view further W-graph data. For example, the current user may select a first representative edge 860 that represents 3 distinct user techniques (3 distinct sets/sequences of invoked commands) originating from 3 different workflows for 3 different users. In response, the GUI engine 119 may retrieve W-graph data for the selected first representative edge 860 stored to the database 125 and transmit the W-graph data to the client 130, which causes the W-graph data to be displayed within the W-graph data section 875 of the W-graph GUI 800.

Figure 10:
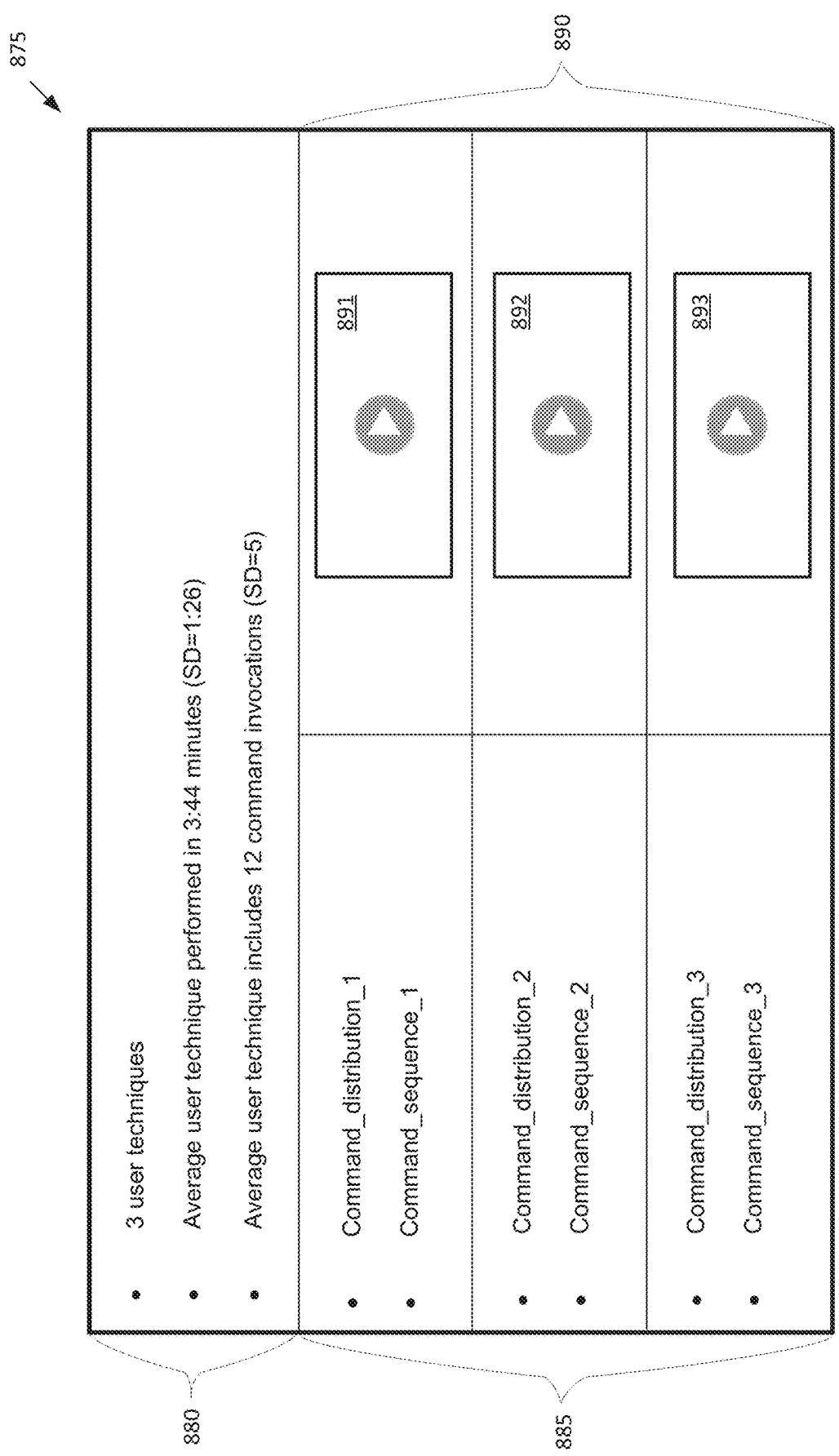
FIG. 10 is a screenshot of the W-graph data section of the W-graph GUI of FIG. 8, according to various embodiments.

FIG. 10 is a screenshot of the W-graph data section of the W-graph GUI of FIG. 8, according to various embodiments. As shown, the W-graph data section 875 may include a plurality of sub-sections including a compiled metrics section 880, a command data section 885, and a screen recording section 890.

The W-graph data for the first representative edge 860 may include compiled metrics for the selected first representative edge 860 that is displayed in the compiled metrics section 880. As shown, the compiled metrics for the selected first representative edge 860 may include a total number of distinct user techniques represented by the first representative edge 860, an average time for performing the user techniques with standard deviation (as indicated by the screen recordings), and an average number of invoked commands for performing the user techniques with standard deviation. In other embodiments, other compiled metrics for the selected representative edge 860 may be displayed in the compiled metrics section 880.

The W-graph data for the first representative edge 860 may also include command data that is displayed in the command data section 885. The command data for each distinct user technique may be separately displayed within the command data section 885. As shown, the displayed command data for each distinct user technique includes a command distribution and a command sequence. Each user technique comprises a set/sequence of commands. The command distribution of a user technique may indicate a total number of invocations for each command in the set of commands. For example, the displayed command distribution for a first user technique ("Command_distribution_1") may specify 3 invocations for the "group" command, 3 invocations for the "move" command, and 4 invocations for the "resize" command. The command sequence may indicate the ordered sequence of commands for the user technique. For example, the displayed command sequence for a first user technique ("Command_sequence_1") may specify the ordered sequence of commands comprising "group," "move," "resize," "group," "move," "resize," "group," "move," "resize," and "resize." In other embodiments, other command data for the selected representative edge 860 may be displayed in the command data section 885.

The W-graph data for the first representative edge 860 may also include screen recordings that are displayed in the screen recording section 890. The recording segment for each distinct user technique may be separately displayed within the screen recording section 890. For example, a first recording segment 891 may be displayed for a first user technique, a second recording segment 892 may be displayed for a second user technique, and a third recording segment 893 may be displayed for a third user technique associated with the selected first representative edge 680. The current user may then select any of the displayed recording segments to playback the recording segment.

Figure 11:
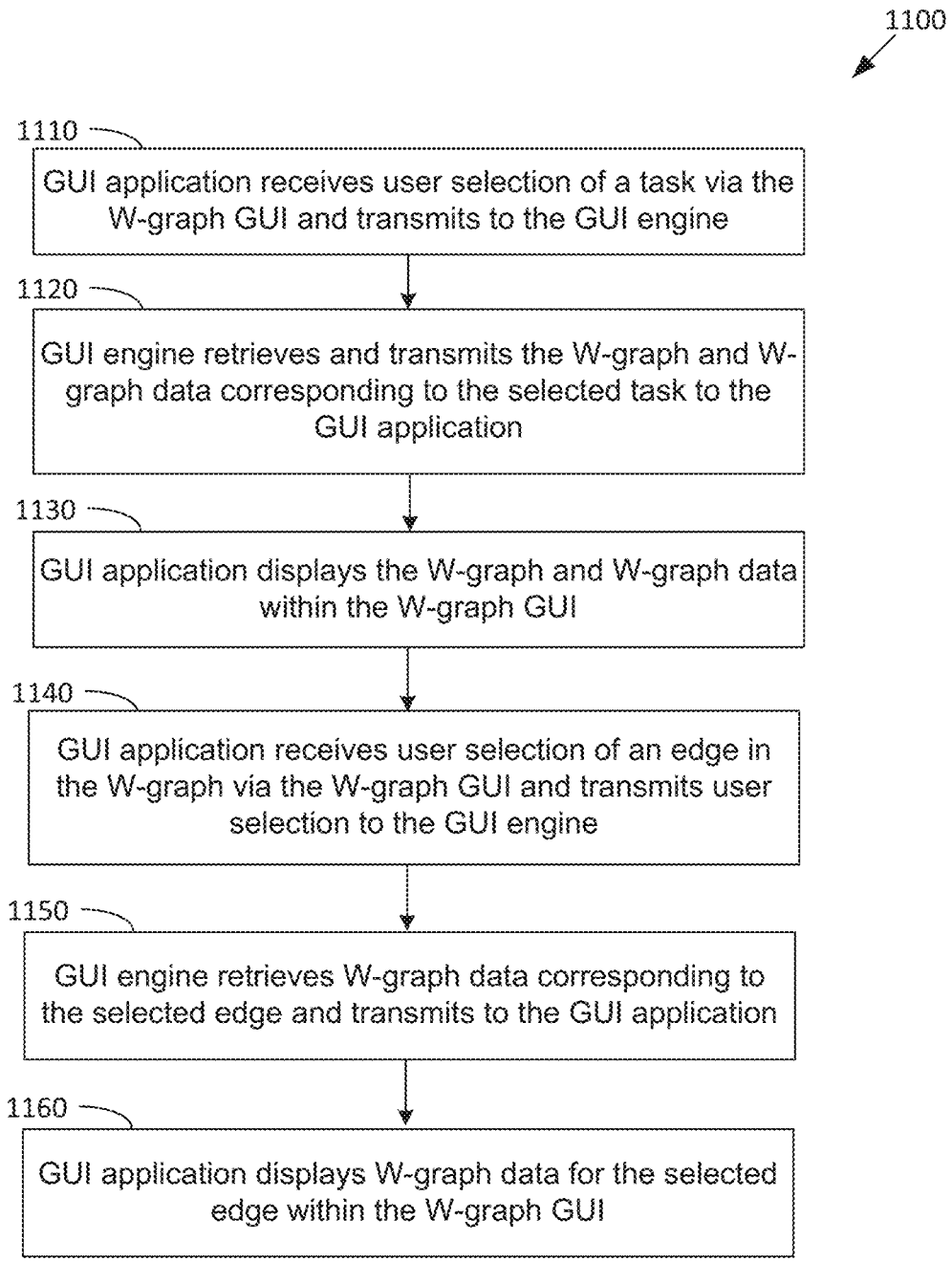
FIG. 11 is a flow diagram of method steps for displaying and interacting with a W-graph generated for a task, according to various embodiments.

FIG. 11 is a flow diagram of method steps for displaying and interacting with a W-graph generated for a task, according to various embodiments. Although the method steps are described in conjunction with the systems of FIGS. 1-2, 4-6, and 8-10, persons skilled in the art will understand that the method steps can be performed in any order by any system. In some embodiments, the method 1100 may be performed by the GUI engine 119 executing on a server 110 in conjunction with a GUI application 135 executing on a client 130 that displays a W-graph GUI.

The method 1100 begins when the GUI application 135 receives (at step 1110) a user selection of a task via the W-graph GUI 800 and transmits the user selection of the selected task to the GUI engine 119. In response, the GUI engine 119 retrieves (at step 1120) a W-graph and W-graph data corresponding to the selected task from the W-graph library 129 in the database 125. The GUI engine 119 transmits the W-graph and W-graph data to the GUI application 135.

The GUI application 135 displays (at step 1130) the W-graph and W-graph data within the W-graph GUI. The W-graph illustrates one or more representative workflows, each representative workflow comprising a distinct sequence of representative events from a start node 855 to an end node 870. Each representative event comprises a representative edge 860 and a representative node 865. Each representative node 865 displays a content snapshot associated with the representative node 865. Each representative edge 860 comprises a user selectable edge. Each representative edge 860 represents one or more distinct user techniques (distinct sets of commands). Each representative edge 860 is displayed with a particular visual appearance (such as line thickness) based on the number of distinct user techniques that the representative edge 860 represents. The W-graph data displayed in the W-graph GUI may include compiled metrics for the overall W-graph, such as a total number of distinct representative workflows, an average time for performing the representative workflows, and an average number of invoked commands for performing the representative workflows.

The GUI application 135 then receives (at step 1140) a user selection of a representative edge in the W-graph via the W-graph GUI 800 and transmits the user selection of the representative edge to the GUI engine 119. In response, the GUI engine 119 retrieves (at step 1150) W-graph data corresponding to the selected representative edge from the database 125 and transmits the W-graph data to the GUI application 135. The GUI application 135 displays (at step 1160) the W-graph data for the selected representative edge within the W-graph GUI. The displayed W-graph data may include compiled metrics for one or more user techniques represented by the selected representative edge, command data (such as a command distribution and a command sequence) for each distinct user technique represented by the selected representative edge, and a recording segment for each distinct user technique represented by the selected representative edge. The method 1100 then ends.

Runtime Phase Using a W-Suggest GUI

After the W-graph library 129 is produced, the W-graph library 129 may also be leveraged during a runtime phase using a W-suggest GUI. During the runtime phase using a W-suggest GUI, a current user may perform a particular task via a design application and wish to have the overall process implemented by the current user to be analyzed for optimization (greater efficiency). In some embodiments, a W-suggest function includes the analysis of a current workflow (condensed workflow) for a current user performing a task based on a comparison of the current workflow with a W-graph generated for the same task. In particular, the W-suggest engine 118 may generate a modified current workflow that includes one or more highlighted/designated edges, each highlighted/designated edge indicating a user technique that may be improved in terms of efficiency. The modified current workflow may be displayed in the W-suggest GUI for viewing by the current user. The current user may also interact with the modified current workflow via the W-suggest GUI to request and receive further information related to the modified current workflow, such as command data information or screen recordings associated with the highlighted/designated edges. Advantageously, the modified current workflow may indicate one or more user techniques implemented by the current user that are determined to be less efficient than one or more corresponding user techniques implemented by the other users. The current user may then implement the more efficient user techniques when performing the same task in the future.

Figure 12:
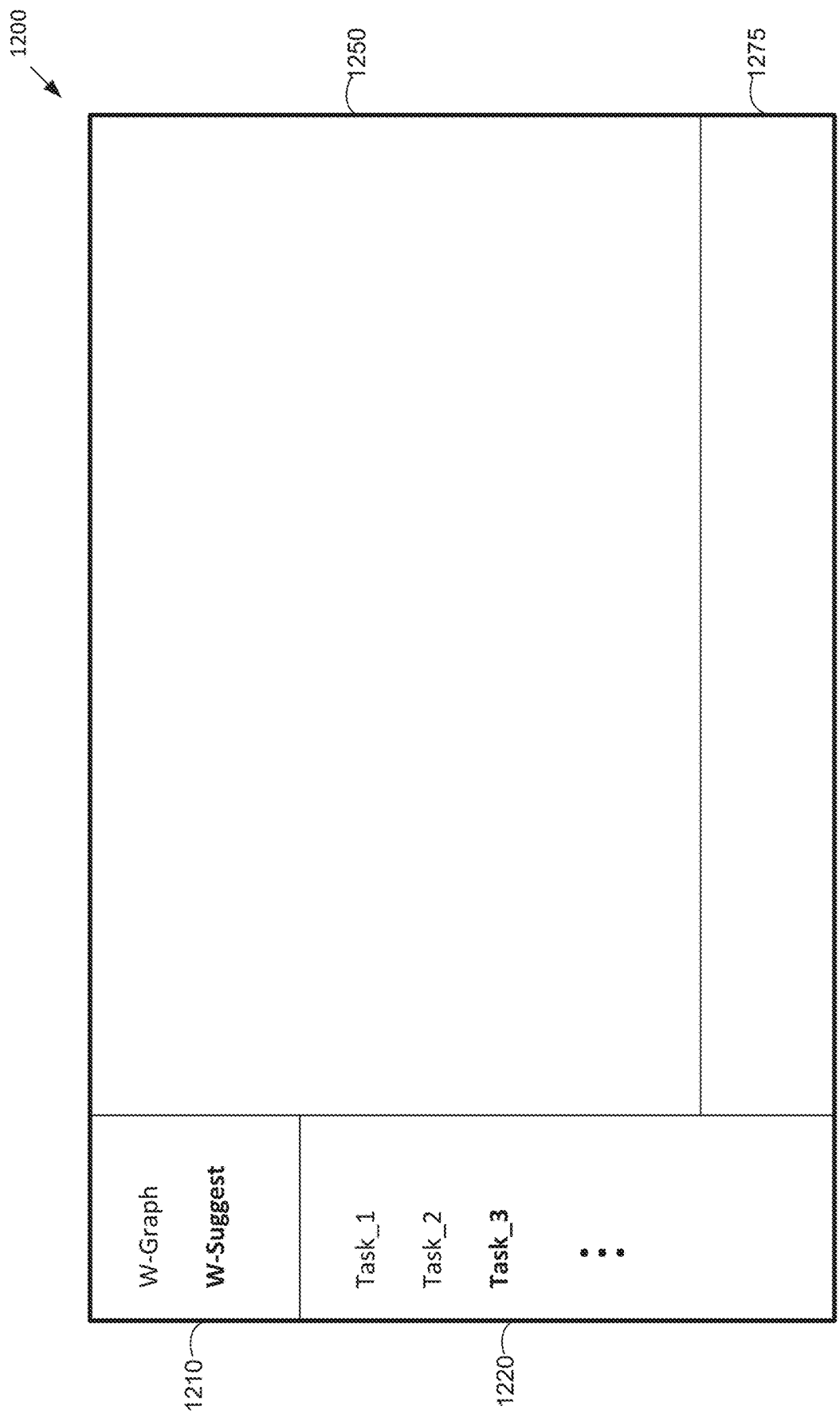
FIG. 12 is a screenshot of a W-suggest GUI for displaying and interacting with a modified workflow, according to various embodiments.

In these embodiments, the GUI engine 119 executing on the server 110 may interact with the GUI application 135 executing on the client 130 which displays a W-suggest GUI. FIG. 12 is a screenshot of a W-suggest GUI for displaying and interacting with a modified workflow, according to various embodiments. The W-suggest GUI 1200 may include a plurality of sections including a mode selection section 1210, a task selection section 1220, a modified current workflow section 1250, and a comparison data section 1275.

The mode selection section 1210 displays user selectable modes including the W-graph mode and the W-suggest mode. The W-suggest mode implements the W-suggest GUI discussed in this section and it is assumed a current user has currently selected the W-suggest mode, as indicated by the bolded text in FIG. 12. The task selection section 1220 displays a plurality of user selectable tasks (e.g., Task_1, Task_2, Task_3, etc.). The modified current workflow section 1250 displays a modified current workflow corresponding to a selected task. The modified current workflow may include user selectable components, such as selectable edges. The comparison data section 1275 may display comparison information (event data) regarding the modified current workflow and the primary representative workflow, such as compiled metrics, command data, and screen recordings.

For example, the current user may select the W-suggest mode and a third task (Task_3) for designing a 3D model of a coffee mug, as indicated by the bolded text in FIG. 12. In response to the selection of the W-suggest mode and the selected task, the GUI engine 119 retrieves a W-graph corresponding to the selected task from the W-graph library 129 stored to the database 125. The GUI engine 119 may also obtain a current workflow for the current user performing the selected task based on previous event data (if the current user has already performed the selected task) or newly generated event data (if the current user has not already performed the selected task).

If the current user has previously performed the selected task, the GUI engine 119 may retrieve the previous event data corresponding to the user and the selected task from an event data table generated for the selected task, which is stored to the repository of event data 127 in the database 125. Based on the previous event data, the GUI engine 119 may cause the W-graph engine 116 to generate a current workflow (condensed workflow) for the current user performing the selected task. If the current user has not previously performed the selected task, the current user may perform the selected task via the design application 133 to generate new event data. Based on the new event data, the GUI engine 119 may then cause the W-graph engine 116 to generate the current workflow (condensed workflow) for the current user performing the selected task. Techniques for generating a condensed workflow for a user is discussed above in relation to FIG. 5 and is not discussed in detail here.

The GUI engine 119 then causes the W-suggest engine 118 to generate a modified current workflow based on a comparison between the current workflow and the W-graph for the selected task. As discussed above, the W-graph comprises one or more distinct representative workflows. The W-suggest engine 118 may determine a primary representative workflow within the W-graph comprising the shortest (most efficient) representative workflow within the W-graph. In other embodiments, the W-suggest engine 118 determines a primary representative workflow within the W-graph comprising the most popular, the most commonly used by a particular group (such as machinists), the most unique, or the most advanced representative workflow within the W-graph.

The shortest (most efficient) representative workflow may be determined based on the number of total number of invoked commands and/or the total time required to complete the task. The total number of invoked commands may be determined by summing the set of commands represented by each representative edge in the representative workflow. If a representative edge represents two or more sets of commands (user techniques), the set of commands having the least number of commands may be used in the summation. The total time may be determined by summing the times for the recording segment associated with each representative edge in the representative workflow. If a representative edge is associated with two or more recording segments, the recording segment having the lowest time may be used in the summation. Thus, the primary representative workflow may comprise the representative workflow having the lowest total number of commands and/or the lowest total performance time among all representative workflows within the W-graph.

The W-suggest engine 118 may then determine similar node pairs between the current workflow and the primary representative workflow. For example, the W-suggest engine 118 may implement techniques of the node merging stage for determining similar nodes between the current workflow and the primary representative workflow. In particular, the W-suggest engine 118 may implement a selected similarity metric and corresponding threshold value to determine similar node pairs between the current workflow and the primary representative workflow. Thus, similar node pairs may comprise two nodes that represent two design/task states that are determined to be similar within a threshold value.

For each node in a similar node pair, there is a corresponding edge that produces the node. Thus, a first node in a similar node pair may comprise a first node in the current workflow having a corresponding first edge. The first edge represents a first user technique that produces the design state represented by the first node. The node in the current workflow is referred to herein as the "current node" and the corresponding edge for the current node in the current workflow is referred to herein as the "current edge." Also, a second node in a similar node pair may comprise a second node in the primary representative workflow having a corresponding second edge. The second edge represents a second user technique that produces the design state represented by the second node. The node in the primary representative workflow is referred to herein as the "primary representative node" and the corresponding edge for the primary representative node in the primary representative workflow is referred to herein as the "primary representative edge." Thus, the primary representative workflow may comprise a plurality of primary representative edges representing a plurality of user techniques, each primary representative edge in the primary representative workflow corresponding to a current edge in the current workflow.

The W-suggest engine 118 may then compare the corresponding edges (current edge and primary representative edge) of the similar node pair (current node and primary representative node) based on a number of command invocations associated with each corresponding edge. In particular, the W-suggest engine 118 may determine a first number of commands in the set of commands represented by the current edge, determine a second number of commands in the set of commands represented by the primary representative edge, and subtract the second number from the first number to determine a delta value (i.e., first number−second number=delta value). A positive delta value indicates that the current edge represents a greater number of commands than the primary representative edge. Thus, a positive delta value indicates that the current edge represents a less efficient user technique than the primary representative edge in terms of a number of command invocations. A negative delta value indicates that the current edge represents a lesser number of commands than the primary representative edge. Thus, a negative delta value indicates that the current edge represents a more efficient user technique than the primary representative edge in terms of a number of command invocations. The delta value may be associated with the current edge and the primary representative edge.

The W-suggest engine 118 may determine a delta value for each similar node pair to determine a plurality of delta values associated with a plurality of current edges in the current workflow. The W-suggest engine 118 may then designate one or more current edges having the one or more highest associated delta values within the plurality of delta values as the one or more highlighted edges in the modified current workflow. For example, the W-suggest engine 118 may designate the current edge having the highest associated delta value within the plurality of delta values as a highlighted edge in the modified current workflow. For example, the W-suggest engine 118 may designate the two current edges having the two highest associated delta values within the plurality of delta values as two highlighted edges in the modified current workflow, and so forth. Thus, the current workflow now comprises a set of one or more designated edges and a set of one or more non-designated edges. The one or more designated edges in the current workflow represent one or more user techniques that are determined to be the most inefficient within the current workflow in comparison to the primary representative workflow based on command invocations.

The W-suggest engine 118 then generates a modified current workflow that visually highlights the one or more designated edges. The modified current workflow may comprise the current workflow that includes a sequence of edges and nodes. However, the modified current workflow may configure the visual appearance of the one or more designated edges to have a different display appearance than the other non-designated edges of the modified current workflow. The displayed appearance of a designated edge may be different than the displayed appearance of a non-designated edge in at least one display characteristic, such as color, texture, shading, pattern, line form, and the like.

In other embodiments, the W-suggest engine 118 may compare the corresponding edges (current edge and primary representative edge) of the similar node pair (current node and primary representative node) based on a performance time associated with each corresponding edge. The performance time associated with an edge may be determined from the recording segment associated with the edge. In particular, the W-suggest engine 118 may determine a first performance time for a first user technique represented by the current edge, determine a second performance time for a second user technique represented by the primary representative edge, and subtract the second performance time from the first performance time to determine a delta value (i.e., first performance time−second performance time=delta value). A positive delta value indicates that the current edge represents a longer performance time than the primary representative edge. Thus, a positive delta value indicates that the current edge represents a less efficient user technique than the primary representative edge in terms of performance time. A negative delta value indicates that the current edge represents a shorter performance time than the primary representative edge. Thus, a negative delta value indicates that the current edge represents a more efficient user technique than the primary representative edge in terms of performance time.

The W-suggest engine 118 may determine a delta value for each similar node pair to determine a plurality of delta values associated with a plurality of current edges in the current workflow. The W-suggest engine 118 may then designate one or more current edges having the one or more highest associated delta values within the plurality of delta values. Thus, the one or more designated edges in the current workflow represent one or more user techniques that are determined to be the most inefficient within the current workflow in comparison to the primary representative workflow based on performance time. The W-suggest engine 118 then generates a modified current workflow that highlights the one or more designated edges.

After the W-suggest engine 118 generates the modified current workflow for the selected task, the GUI engine 119 may transmit the modified current workflow and comparison data (event data) for the modified current workflow and the primary workflow to the GUI application 135 which displays the modified current workflow and the comparison data within W-suggest GUI 1200.

Figure 13:
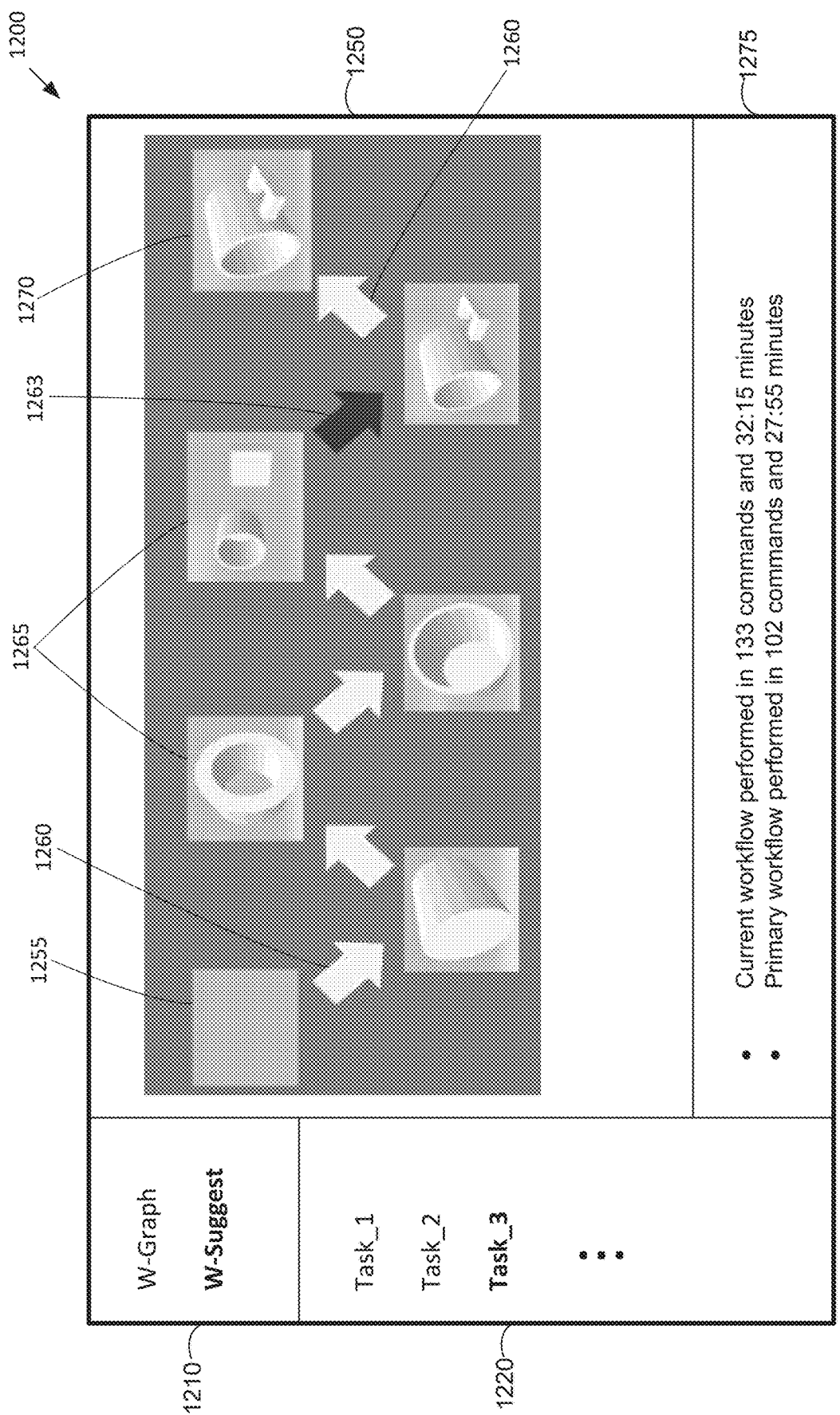
FIG. 13 is a screenshot of a modified workflow displayed on the W-suggest GUI of FIG. 12, according to various embodiments.

FIG. 13 is a screenshot of a modified workflow displayed on the W-suggest GUI of FIG. 12, according to various embodiments. As shown, the modified current workflow is displayed within the modified workflow section 1250 and the comparison data (event data) is displayed within the comparison data section 1275 of the W-suggest GUI 1200. The modified current workflow comprises a sequence of events from a start node 1255 (representing a start state) to an end node 1270 (representing the completed task). Each event comprises an edge and a node 1265. Each node 1265 in the modified current workflow may be configured to display a content snapshot associated with the node 1265. As shown in the example of FIG. 13, each node 1265 displays a content snapshot illustrating the state of the task for designing a coffee mug.

Each edge in the modified current workflow may comprise a user selectable edge. Each edge in the modified current workflow comprises either a designated/highlighted edge 1263 or a non-designated/non-highlighted edge 1260. In the example of FIG. 13, the modified current workflow includes one designated edge 1263. In other embodiments, the modified current workflow may include a plurality of designated edges 1263. In the example of FIG. 13, the designated edge 1263 is displayed with a darker appearance than the non-designated edges 1260. In other embodiments, the designated edge 1263 is displayed with a different appearance than the non-designated edges 1260 in at least one display characteristic, such as color, texture, shading, pattern, line form, and the like.

Comparison data (event data) is displayed within the comparison data section 1275 of the W-suggest GUI 1200. In some embodiments, the GUI application 135 receives and displays compiled metrics for the current workflow and the primary representative workflow in the comparison data section 1275. As shown, the compiled metrics may include a total number of commands invoked in the current workflow and the primary representative workflow and a total performance time for the current workflow and the primary representative workflow. In other embodiments, other compiled metrics for the current workflow and the primary representative workflow may be displayed in the comparison data section 1275.

Figure 14:
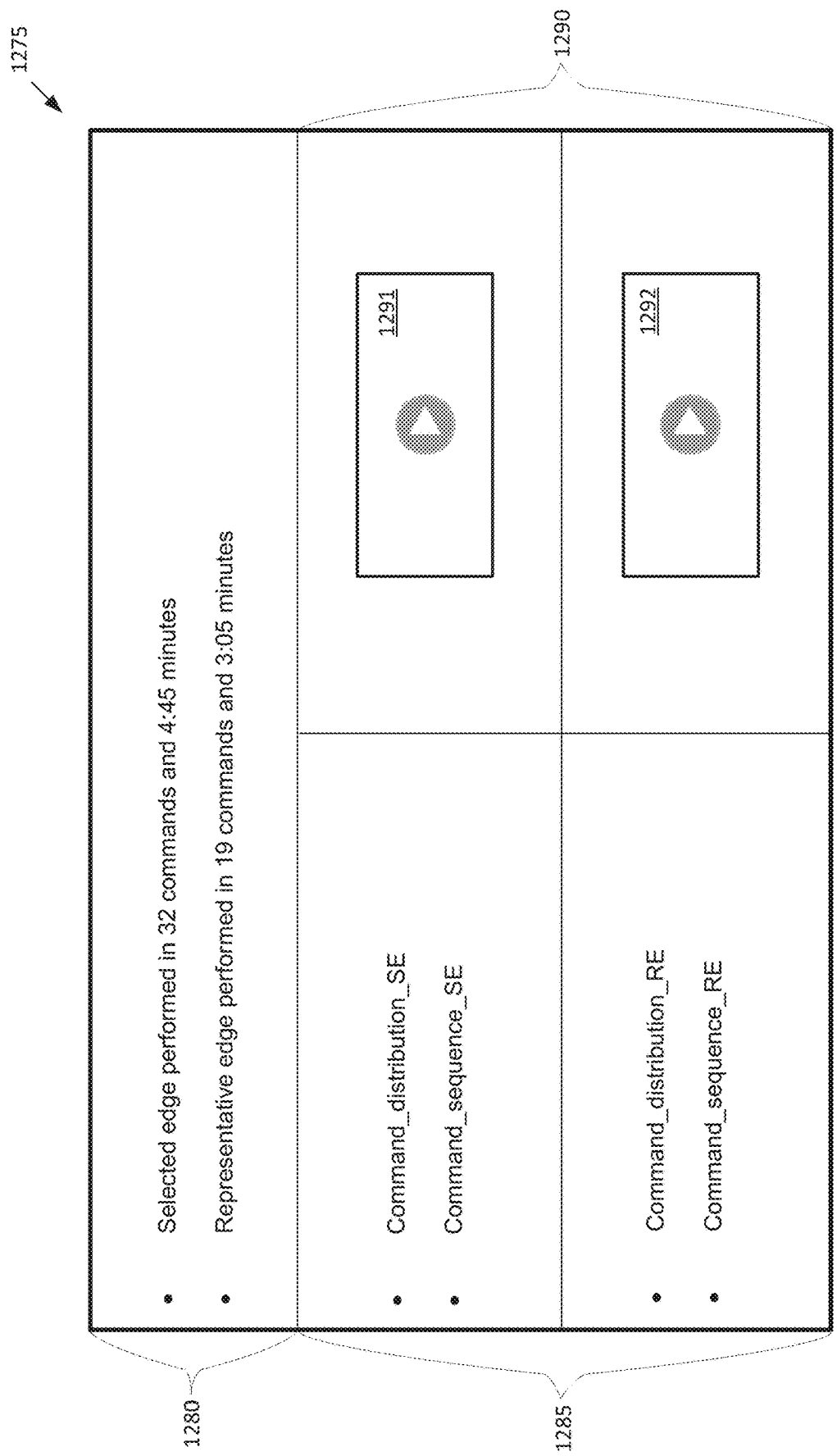
FIG. 14 is a screenshot of the comparison data section of the W-suggest GUI of FIG. 12, according to various embodiments.

The current user may also interact with the modified current workflow displayed in the W-suggest GUI 1200 to request and view further comparison data for the modified current workflow and the primary representative workflow, such as command data information or screen recordings associated with edges of the modified current workflow. For example, the current user may select a designated/highlighted edge 1263 of the modified current workflow via the W-suggest GUI 1200. In response, the GUI engine 119 may retrieve comparison data (event data) for the designated/highlighted edge 1263 and the corresponding representative edge in the primary representative workflow stored to the database 125 and transmit the comparison data to the client 130, which causes the comparison data to be displayed within the comparison data section 1275 of the W-suggest GUI 1200. In other embodiments, any edge (including non-designated edges) in the modified current workflow may be selected by the user to view comparison data for the selected edge and the corresponding representative edge in the primary representative workflow FIG. 14 is a screenshot of the comparison data section of the W-suggest GUI of FIG. 12, according to various embodiments. As shown, the comparison data section 1275 may include a plurality of sub-sections including a compiled metrics section 1280, a command data section 1285, and a screen recording section 1290.

The comparison data for the selected edge may include compiled metrics for the selected edge in the modified current workflow and the corresponding representative edge in the primary representative workflow that is displayed in the compiled metrics section 1280. As shown, the compiled metrics may include a total number of invoked commands represented by the selected edge and the corresponding representative edge. The compiled metrics may also include a total performance time (as indicated by the associated recording segments) for the user technique represented by the selected edge and the corresponding representative edge. In other embodiments, other compiled metrics for the selected edge in the modified current workflow and the corresponding representative edge in the primary representative workflow may be displayed in the comparison data section 1275.

The comparison data for the selected edge may also include command data that is displayed in the command data section 1285. The command data for the selected edge and the corresponding representative edge may be separately displayed within the command data section 1285. As shown, the displayed command data for each edge includes a command distribution and a command sequence. The command distribution ("Command_distribution_SE") for the selected edge may indicate a total number of invocations for each command in the set of commands represented by the selected edge. The command distribution ("Command_distribution_RE") for the corresponding representative edge may indicate a total number of invocations for each command in the set of commands represented by the corresponding representative edge. The command sequence ("Command_sequence_SE") for the selected edge may specify the ordered sequence of commands in the set of commands represented by the selected edge. The command sequence ("Command_sequence_RE") for the corresponding representative edge may specify the ordered sequence of commands in the set of commands represented by the corresponding representative edge. In other embodiments, other command data for the selected edge in the modified current workflow and the corresponding representative edge in the primary representative workflow may be displayed in the command data section 1285.

The comparison data for the selected edge may also include screen recordings that are displayed in the screen recording section 1290. The recording segment associated with each edge may be separately displayed within the screen recording section 1290. For example, a first recording segment 1291 may be displayed for the selected edge and a second recording segment 1292 may be displayed for the corresponding representative edge. The current user may then select any of the displayed recording segments to playback the recording segment.

Figure 15:
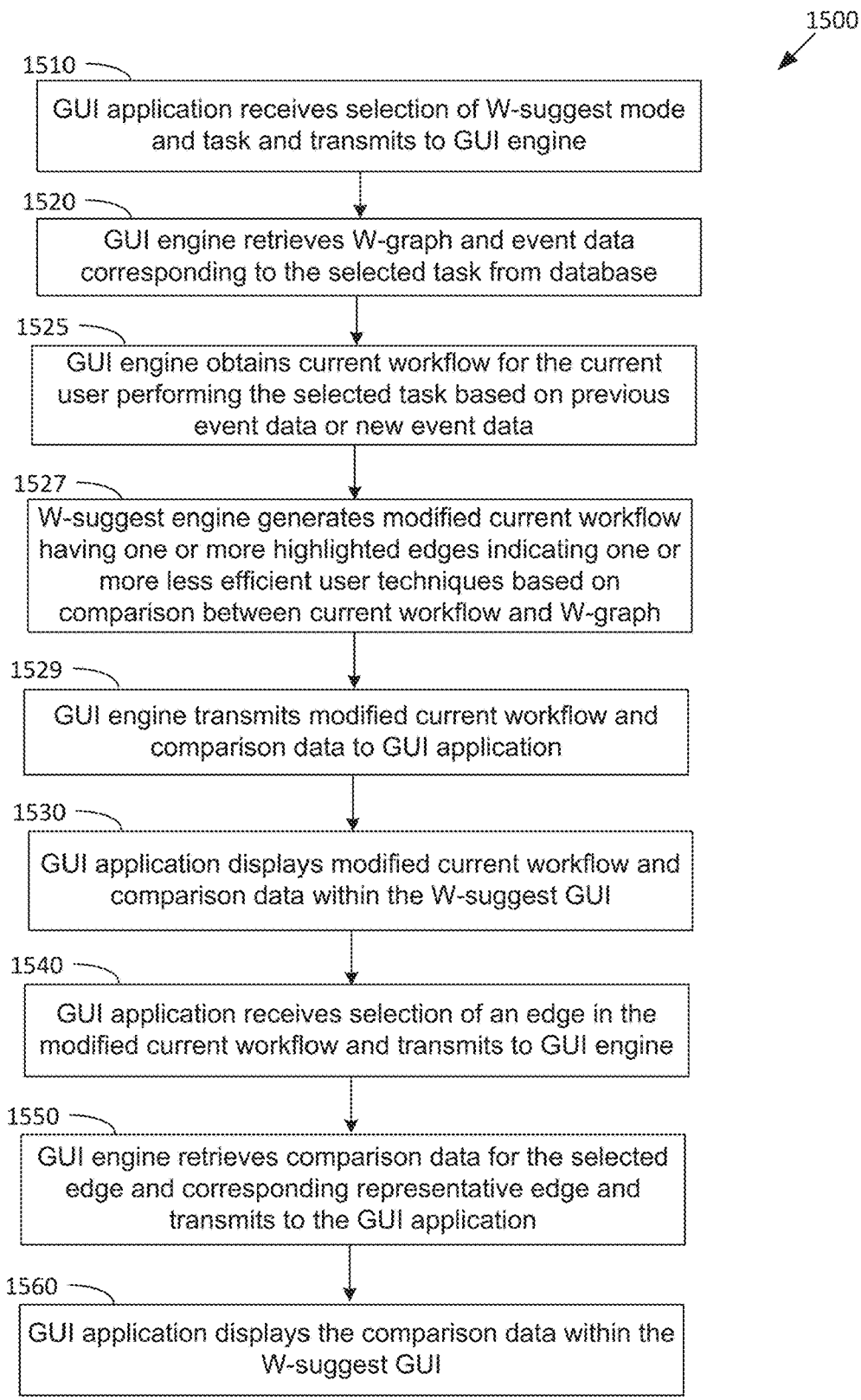
FIG. 15 is a flow diagram of method steps for displaying and interacting with a W-graph generated for a task, according to various embodiments.

FIG. 15 is a flow diagram of method steps for displaying and interacting with a W-graph generated for a task, according to various embodiments. Although the method steps are described in conjunction with the systems of FIGS. 1-2, 4-6, 8-10, and 12-14, persons skilled in the art will understand that the method steps can be performed in any order by any system. In some embodiments, the method 1500 may be performed by the GUI engine 119 and W-suggest engine 118 executing on a server 110 in conjunction with a GUI application 135 executing on a client 130 that displays a W-suggest GUI.

The method 1500 begins when the GUI application 135 receives (at step 1510) a user selection of the W-suggest mode and a particular task via the W-suggest GUI 800 and transmits the user selections to the GUI engine 119. In response, the GUI engine 119 retrieves (at step 1520) a W-graph and event data corresponding to the selected task from the W-graph library 129 in the database 125.

The GUI engine 119 obtains (at step 1525) a current workflow (condensed workflow) for the current user performing the selected task based on previous event data (if the current user has already performed the selected task) or newly generated event data (if the current user has not already performed the selected task). If the current user has previously performed the selected task, the GUI engine 119 may retrieve the previous event data corresponding to the user and the selected task from the database 125 and initiate/cause the W-graph engine 116 to generate a current workflow (condensed workflow) for the current user performing the selected task. If the current user has not previously performed the selected task, the current user may perform the selected task via the design application 133 to generate new event data. Based on the new event data, the GUI engine 119 may then initiate/cause the W-graph engine 116 to generate the current workflow (condensed workflow) for the current user performing the selected task.

The GUI engine 119 then initiates/causes the W-suggest engine 118 to generate (at step 1527) a modified current workflow comprising a modified version of the current workflow having one or more highlighted edges. The modified current workflow may be generated based on a comparison between the current workflow and a primary representative workflow of the W-graph for the selected task, the primary representative workflow comprising the most efficient representative workflow within the W-graph in terms of number of commands and/or performance time. Each highlighted edge of the modified current workflow may represent a user technique that is less efficient than the user technique represented by the corresponding representative edge in the primary representative workflow in terms of number of commands and/or performance time. As discussed above, a user technique may comprise a set of commands invoked by a user, and a first user technique may be determined to be less efficient than a second user technique based on a comparison between the number of commands and/or a time length of screen recordings associated with the user technique.

The GUI engine 119 transmits (at step 1529) the modified current workflow and comparison data (event data) to the GUI application 135. The GUI application 135 displays (at step 1530) the modified current workflow and comparison data within the W-suggest GUI. The one or more highlighted edges in the modified current workflow are displayed with a different appearance than the non-highlighted edges in the modified current workflow. Each edge in the modified current workflow may be user selectable. The W-suggest GUI also displays the comparison data, such as compiled metrics for the modified current workflow and the primary representative workflow.

The GUI application 135 then receives (at step 1540) a user selection of an edge in the modified current workflow via the W-suggest GUI 800 and transmits the user selection to the GUI engine 119. In response, the GUI engine 119 retrieves (at step 1550) comparison data (event data) for the selected edge in the modified current workflow and the corresponding representative edge in the primary representative workflow from the database 125 and transmits the comparison data to the GUI application 135.

The GUI application 135 displays (at step 1560) the comparison data within the W-suggest GUI. The displayed comparison data may include compiled metrics, command data (such as a command distribution and a command sequence), and a recording segment for both the selected edge in the modified current workflow and the corresponding representative edge in the primary representative workflow. The method 1500 then ends.

Server and Client Machines

Figure 16:
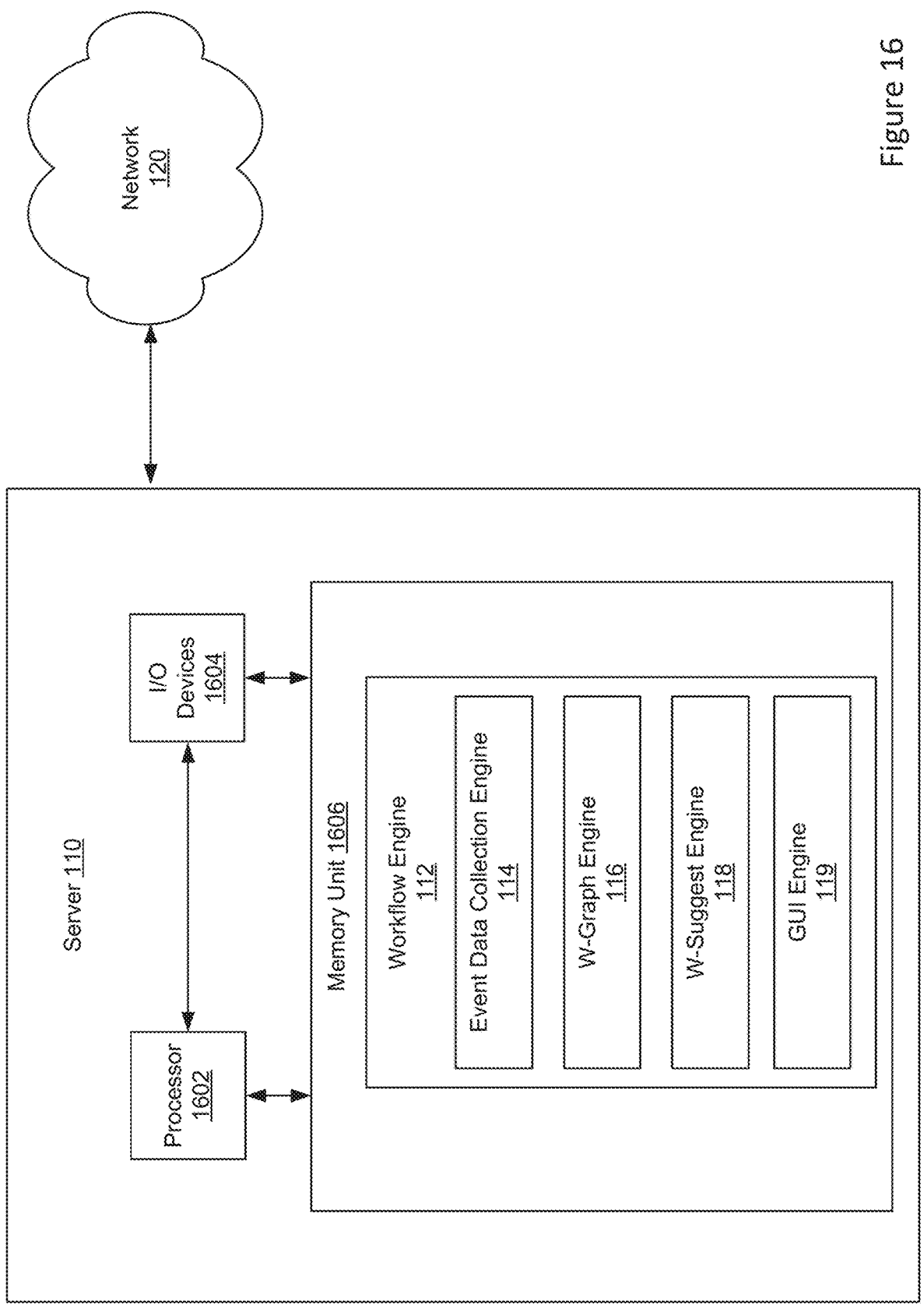
FIG. 16 illustrates an exemplary server device that can be implemented in the system of FIG. 1, according to various embodiments.

FIG. 16 illustrates an exemplary server device that can be implemented in the system of FIG. 1, according to various embodiments. The server 110 may comprise a computing device or machine, such as a server system, desktop computer, laptop computer, or any other type of computing device suitable for practicing various embodiments. The server 110 comprises at least one processor 1602, input/output (I/O) devices 1604, and a memory unit 1606, coupled together. The server 110 is coupled to a network 120 via a network interface (not shown). The network 120 may comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

In general, a processor 1602 may be any technically feasible processing device or hardware unit capable of processing data and executing software applications and program code. The processor 1602 executes the software and performs the functions and operations set forth in the embodiments described herein. For example, a processor 1602 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 1606 may include a hard disk, a random access memory (RAM) module, a flash memory unit, or any other type of memory unit or combination thereof. Processor and I/O devices read data from and write data to memory 1606. The memory unit 1606 is configured to store software application(s) and data. Instructions from the software constructs within the memory unit 1606 are executed by processors to enable the operations and functions described herein. In various embodiments, the memory unit 1606 is configured to store a workflow engine 112 comprising an event data collection engine 114, a W-graph engine 116, a W-suggest engine 118, and a GUI engine 119 for performing embodiments herein. The server 110 may be connected to a database 125 (not shown) that stores event data 127 received from the clients 130. The processor 1602 is configured to execute the workflow engine 112 to provide an underlying functionality of a W-graph system as described in various embodiments herein.

I/O devices 1604 are also coupled to memory 1606 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth.

Figure 17:
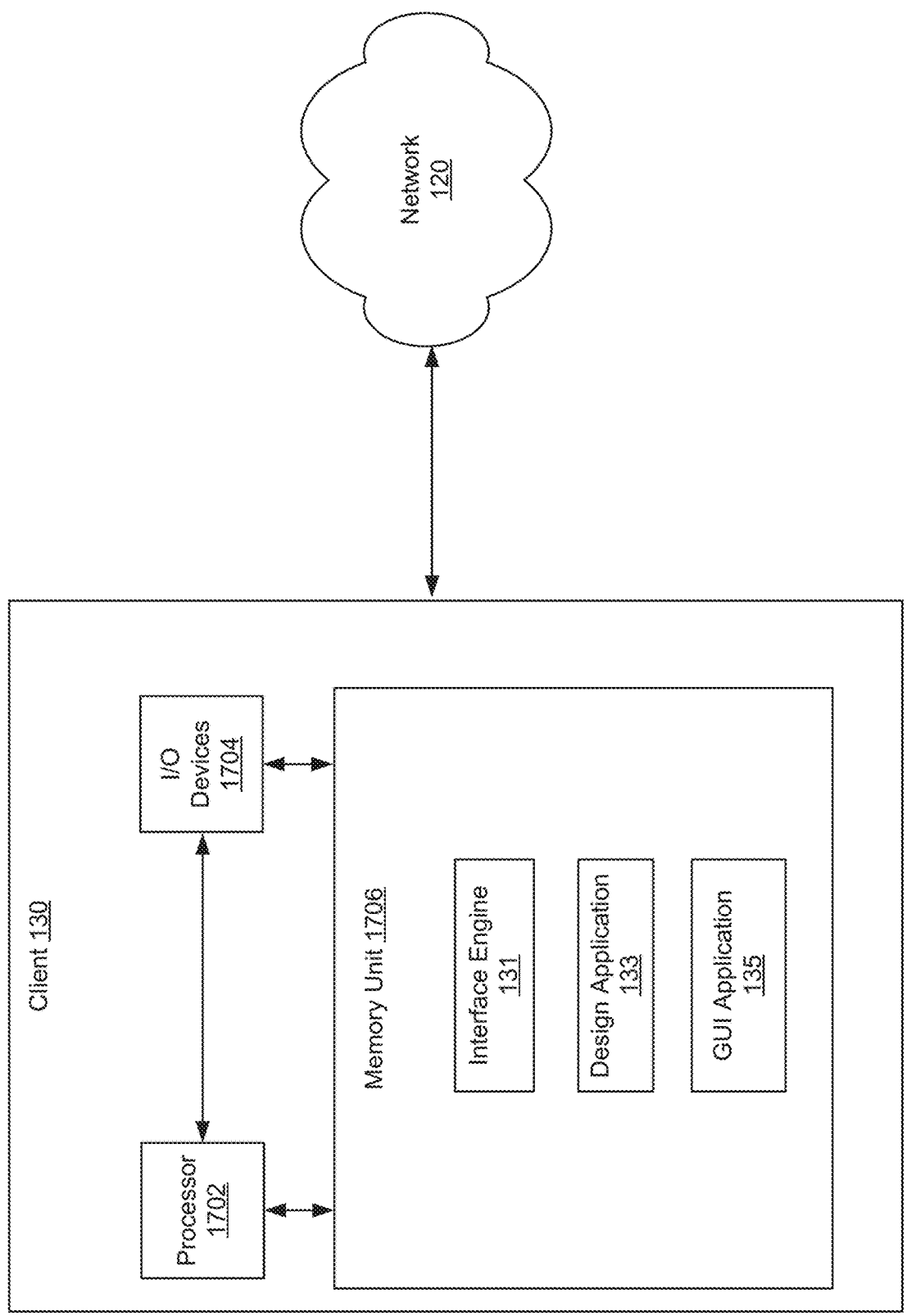
FIG. 17 illustrates an exemplary client device that can be implemented in the system of FIG. 1, according to various embodiments.

FIG. 17 illustrates an exemplary client device that can be implemented in the system of FIG. 1, according to various embodiments. The client 130 may comprise a computing device or machine, such as a desktop computer, laptop computer, mobile device, or any other type of computing device suitable for practicing various embodiments.

The client 130 comprises at least one processor 1702, input/output (I/O) devices 1704, and a memory unit 1706, coupled together. The client 130 is coupled to a network 120 via a network interface (not shown). In general, a processor 1702 may be any technically feasible processing device or hardware unit capable of processing data and executing software applications and program code. The processor 1702 executes the software and performs the functions and operations set forth in the embodiments described herein. For example, a processor 1702 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 1706 may include a hard disk, a random access memory (RAM) module, a flash memory unit, or any other type of memory unit or combination thereof. Processor and I/O devices read data from and write data to memory 1706. The memory unit 1706 is configured to store software application(s) and data. Instructions from the software constructs within the memory unit 1706 are executed by processors to enable the operations and functions described herein. In various embodiments, the memory unit 1706 is configured to store an interface engine 131, a design application 133, and a GUI application 135 for performing embodiments herein. The processor 1702 is configured to execute the interface engine 131, design application 133, and GUI application 135 to provide an underlying functionality of a W-graph system as described in various embodiments herein.

I/O devices 1704 are also coupled to memory 1706 and may include devices capable of receiving input, such as a keyboard, a mouse, a trackball, and so forth, as well as devices capable of providing output, such as a monitor/display, speaker, and so forth. Additionally, I/O devices may include devices capable of both receiving input and providing output, such as a touchscreen, a universal serial bus (USB) port, and so forth. In particular, the I/O devices may further include a display monitor that displays the W-graph GUI, W-suggest GUI, or any other type of GUI.

In sum, embodiments described herein are directed towards a W-graph system comprising a server connected with a plurality of clients/users via a network. Each client/user executes a design application for performing a particular design task (such as designing a 3D model of a particular object). The W-graph system operates in three phases: an event data collection phase, a W-graph library building phase, and a runtime phase using a W-graph graphical user interface (GUI) and/or a W-suggest GUI.

During the event data collection phase, the server collects timestamped event data for the plurality of clients/users performing different design tasks. During the W-graph library building phase, the server generates a plurality of different W-graphs for a plurality of different tasks based on the collected event data. A separate W-graph is generated for each task based on the event data collected from a plurality of clients/users performing the same task. For each user, the server generates an original workflow that represents the overall process the user implemented to perform the task. The server also generates a condensed workflow based on the original workflow, the condensed workflow comprising a set of combined nodes. Each combined node may represent similar nodes from the original workflow that represent design states determined to be similar within a threshold value. The server may further generate the W-graph comprising one or more representative workflows. A representative workflow may include at least one merged node representing similar nodes originating from different workflows for different users. Each W-graph may be stored to a database for storing the W-graph library.

During the runtime phase using a W-graph GUI, a current user may wish to perform a particular task via a design application and view a W-graph for the particular task prior to performing the task. The server may receive a selection of a particular task via a user interface executing on a current client operated by the current user. In response, the server retrieves the W-graph for the selected task from the W-graph library and causes the W-graph to be displayed at the current client via a W-graph GUI. The current user may interact with the W-graph GUI to request and receive further information related to the W-graph, such as command data information or screen recordings.

At least one technical advantage of the disclosed techniques relative to the prior art is that the disclosed techniques enable a workflow graph to be generated and displayed that provides a graphical representation of multiple workflows implemented by multiple users when performing the same design task. Among other things, the workflow graph provides a summarized illustration of the multiple workflows that allows a user to easily view and comprehend different workflows implemented by other users who have previously performed the same design task. In particular, the workflow graph can illustrate how the different workflows implemented by multiple other users converge with one another (indicating similarities) and diverge from one another (indicating differences). In this manner, a user can explore different workflows not yet implemented or considered by the user when performing a given design task, which allows the user to discover and implement a more effective workflow for the design task.

Another technical advantage relative to the prior art is that transmitting a workflow graph between the server machine and client machine involves far less transmitted data than in previous techniques that transmit a large amount of recorded data to the client (that specify commands and resulting states for each user when performing the particular task). Consequently, the disclosed techniques reduce network bandwidth consumption and network congestion relative to previous approaches.

In other embodiments, during the runtime phase using a W-suggest GUI, a current user may perform a particular task via a design application and wish to have the overall process implemented by the current user to be analyzed for optimization (greater efficiency). A W-suggest function includes the analysis of a current workflow for a current user performing a task based on a comparison of the current workflow with a W-graph generated for the same task. In these embodiments, the server may obtain a current workflow (condensed workflow) for the current user performing the particular task. The server also retrieves the W-graph for the selected task from the W-graph library, the W-graph comprising one or more representative workflows. The server determines a primary representative workflow within the W-graph comprising the shortest (most efficient) representative workflow within the W-graph. The server then compares the current workflow with the primary representative workflow to designate at least one edge of the current workflow as a highlighted edge. Each designated edge represents a user technique that is less efficient than a user technique represented by a corresponding representative edge in the primary representative workflow. The current workflow may be modified to highlight the at least one designated edge to have a different appearance than the non-designated edges of the current workflow. The server may then cause the modified current workflow to be displayed at the current client via a W-suggest GUI. The current user may interact with the W-suggest GUI to request and receive further information related to the modified current workflow, such as command data information or screen recordings.

At least one technical advantage of the disclosed techniques relative to the prior art is that a computer device is enabled to generate and display a modified current workflow based on a comparison between a workflow implemented by a current user when performing a design task and a workflow graph that provides a graphical representation of multiple workflows implemented by other users when performing the same design task. In particular, the modified current workflow may indicate one or more user techniques implemented by the current user that are determined to be less efficient than one or more corresponding user techniques implemented by the other users. The current user may then implement the more efficient user techniques when performing the design task in the future. In this manner, the current user may more easily analyze and optimize a workflow for performing a particular design task relative to previous approaches.

Another technical advantage relative to the prior art is that transmitting a modified current workflow between the server machine and client machine involves far less transmitted data than in previous techniques that transmit a large amount of recorded data to the client (that specify commands and resulting states for each user when performing the particular task). Consequently, the disclosed techniques reduce network bandwidth consumption and network congestion relative to previous approaches.

Aspects of the subject matter described herein are set out in the following numbered clauses.

1. In some embodiments, a computer-implemented method for analyzing software application workflows, the method comprising: receiving, via a user interface presented on a client device, a selection of a first task that is performed via a design application; performing one or more operations to determine a first edge and a second edge, wherein the first edge is associated with a first user workflow for performing the first task, the second edge is associated with a first workflow graph that graphically represents a plurality of user workflows for performing the first task, and the one or more operations are based on a similarity algorithm that implements one or more machine learning functions; generating a modified first user workflow based on a comparison between the first edge and the second edge; and causing the modified first user workflow to be displayed via the user interface.
2. The computer-implemented method of clause 1, wherein: the first task comprises modeling a first object; and the modified first user workflow comprises a sequence of edges and nodes, each node in the modified first user workflow representing a state of the modeling of the first object.
3. The computer-implemented method of any of clauses 1-2, wherein: the first workflow graph comprises a plurality of representative workflows including a primary representative workflow, the primary representative workflow having a lowest number of total invoked commands relative to all other representative workflows included in the plurality of representative workflows; the first user workflow comprises a plurality of edges representing a plurality of user techniques; and the modified first user workflow comprises a modified version of the first user workflow and includes a first highlighted edge that represents a first user technique that has been determined to be less efficient than all other user techniques included in the plurality of user techniques based on a comparison between the first user workflow and the primary representative workflow.
4. The computer-implemented method of any of clauses 1-3, wherein: the first user workflow comprises a plurality of edges representing a plurality of user techniques; the first workflow graph includes a primary representative workflow comprising a plurality of representative edges representing a plurality of user techniques, each representative edge in the primary representative workflow corresponding to an edge in the first user workflow; and the modified first user workflow comprises a modified version of the first user workflow and includes a first highlighted edge that represents a first user technique that has been determined to be less efficient than a corresponding user technique represented by a corresponding representative edge in the primary representative workflow.
5. The computer-implemented method of any of clauses 1-4, wherein: the first workflow graph comprises a plurality of representative workflows; and the primary representative workflow has a lowest number of total invoked commands relative to all other representative workflows included in the plurality of representative workflows.
6. The computer-implemented method of any of clauses 1-5, wherein: the first workflow graph comprises a plurality of representative workflows; and the primary representative workflow has a lowest performance time relative to all other representative workflows included in the plurality of representative workflows.
7. The computer-implemented method of any of clauses 1-6, wherein the first user technique is associated with a first number of invoked commands, the corresponding representative edge is associated with a second number of invoked commands, and the first number is greater than the second number.
8. The computer-implemented method of any of clauses 1-7, wherein the first user technique is associated with a first performance time, the corresponding representative edge is associated with a second performance time, and the first performance time is greater than the second performance time.
9. The computer-implemented method of any of clauses 1-8, wherein the modified first user workflow comprises a plurality of edges, and further comprising: receiving from the client device, via the user interface, a user selection of a first edge included in the modified first user workflow; retrieving edge information associated with the first edge; and causing the edge information to be displayed, at the client device, via the user interface.
10. The computer-implemented method of any of clauses 1-9, wherein the edge information comprises at least one of compiled metrics, command data, and a screen recording associated with a user technique represented by the first edge.
11. In some embodiments, one or more non-transitory computer-readable media including instructions that, when executed by one or more processors, cause the one or more processors to perform the steps of: receiving, via a user interface presented on a client device, a selection of a first task that is performed via a design application; performing one or more operations to determine a first edge and a second edge, wherein the first edge is associated with a first user workflow for performing the first task, the second edge is associated with a first workflow graph that graphically represents a plurality of user workflows for performing the first task, and the one or more operations are based on a similarity algorithm that implements one or more machine learning functions; generating a modified first user workflow based on a comparison between the first edge and the second edge; and causing the modified first user workflow to be displayed via the user interface.
12. The one or more non-transitory computer-readable media of clause 11, wherein: the first task comprises modeling a first object; and the modified first user workflow comprises a sequence of edges and nodes, each node in the modified first user workflow representing a state of the modeling of the first object.
13. The one or more non-transitory computer-readable media of any of clauses 11-12, wherein: the first workflow graph comprises a plurality of representative workflows including a primary representative workflow, the primary representative workflow having a lowest number of total invoked commands relative to all other representative workflows included in the plurality of representative workflows; the first user workflow comprises a plurality of edges representing a plurality of user techniques; and the modified first user workflow comprises a modified version of the first user workflow and includes a first highlighted edge that represents a first user technique that has been determined to be less efficient than all other user techniques included in the plurality of user techniques based on a comparison between the first user workflow and the primary representative workflow.

14. The one or more non-transitory computer-readable media of any of clauses 11-13, wherein: the first user workflow comprises a plurality of edges representing a plurality of user techniques; the first workflow graph includes a primary representative workflow comprising a plurality of representative edges representing a plurality of user techniques, each representative edge in the primary representative workflow corresponding to an edge in the first user workflow; and the modified first user workflow comprises a modified version of the first user workflow and includes a first highlighted edge that represents a first user technique that has been determined to be less efficient than a corresponding user technique represented by a corresponding representative edge in the primary representative workflow.

15. The one or more non-transitory computer-readable media of any of clauses 11-14, wherein: the first workflow graph comprises a plurality of representative workflows; and the primary representative workflow has a lowest number of total invoked commands relative to all other representative workflows included in the plurality of representative workflows.

16. The one or more non-transitory computer-readable media of any of clauses 11-15, wherein: the first user workflow comprises a plurality of edges representing a plurality of user techniques; and the modified first user workflow comprises a modified version of the first user workflow comprising a first highlighted edge determined to represent a first user technique comprising a least efficient user technique in the plurality of user techniques based on a comparison between the first workflow and the first workflow graph.

17. The one or more non-transitory computer-readable media of any of clauses 11-16, wherein the first highlighted edge is determined to represent the least efficient user technique in the plurality of user techniques based on a total number of invoked commands associated with the first user technique.

18. The one or more non-transitory computer-readable media of any of clauses 11-17, wherein the first highlighted edge is determined to represent the least efficient user technique in the plurality of user techniques based on a total performance time associated with the first user technique.

19. The one or more non-transitory computer-readable media of any of clauses 11-18, wherein the modified first user workflow comprises a plurality of edges, further comprising the steps of: receiving from the client device, via the user interface, a user selection of a first edge included in the modified first user workflow; retrieving edge information associated with the first edge; and causing the edge information to be displayed, at the client device, via the user interface.

20. In some embodiments, a computing system comprising: a memory that includes instructions; and a processor that is coupled to the memory and, upon executing the instructions, performs the steps of: receiving, via a user interface presented on a client device, a selection of a first task that is performed via a design application; performing one or more operations to determine a first edge and a second edge, wherein the first edge is associated with a first user workflow for performing the first task, the second edge is associated with a first workflow graph that graphically represents a plurality of user workflows for performing the first task, and the one or more operations are based on a similarity algorithm that implements one or more machine learning functions; generating a modified first user workflow based on a comparison between the first edge and the second edge; and causing the modified first user workflow to be displayed via the user interface.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for analyzing software application workflows, the method comprising:
    receiving a selection of a first task that is performed via a design application;
    executing, on a first node of a first user workflow for performing the first task and a second node of a first workflow graph that graphically represents a plurality of user workflows for performing the first task, a trained autoencoder to generate a first vector comprising a compact representation of three-dimensional (3D) data associated with the first node and a second vector comprising a compact representation of 3D data associated with the second node;
    determining, via the trained autoencoder, that the first node and the second node are similar based on a comparison between the first vector and the second vector;
    subsequent to determining that the first node and the second node are similar, determining that a first edge associated with the first node should be modified based on a comparison between a feature of the first edge and a similar feature of a second edge associated with the second node;
    generating a modified first user workflow based on a modification to the first edge; and
    causing the modified first user workflow to be displayed via a user interface.

2. The computer-implemented method of claim 1, wherein:
    the first task comprises modeling a first object; and
    the modified first user workflow comprises a sequence of edges and nodes, each node in the modified first user workflow representing a state of the modeling of the first object.

3. The computer-implemented method of claim 1, wherein:
    the first workflow graph comprises a plurality of representative workflows including a primary representative workflow, the primary representative workflow having a lowest number of total invoked commands relative to all other representative workflows included in the plurality of representative workflows;
    the first user workflow comprises a plurality of edges representing a plurality of user techniques; and
    the modified first user workflow comprises a modified version of the first user workflow and includes a first highlighted edge that represents a first user technique that has been determined to be less efficient than all other user techniques included in the plurality of user techniques based on a comparison between the first user workflow and the primary representative workflow.

4. The computer-implemented method of claim 1, wherein:
    the first user workflow comprises a plurality of edges representing a plurality of user techniques;
    the first workflow graph includes a primary representative workflow comprising a plurality of representative edges representing a plurality of user techniques, each representative edge in the primary representative workflow corresponding to an edge in the first user workflow; and
    the modified first user workflow comprises a modified version of the first user workflow and includes a first highlighted edge that represents a first user technique that has been determined to be less efficient than a corresponding user technique represented by a corresponding representative edge in the primary representative workflow.

5. The computer-implemented method of claim 4, wherein:
    the first workflow graph comprises a plurality of representative workflows; and
    the primary representative workflow has a lowest number of total invoked commands relative to all other representative workflows included in the plurality of representative workflows.

6. The computer-implemented method of claim 4, wherein:
    the first workflow graph comprises a plurality of representative workflows; and
    the primary representative workflow has a lowest performance time relative to all other representative workflows included in the plurality of representative workflows.

7. The computer-implemented method of claim 4, wherein the first user technique is associated with a first number of invoked commands, the corresponding representative edge is associated with a second number of invoked commands, and the first number is greater than the second number.

8. The computer-implemented method of claim 4, wherein the first user technique is associated with a first performance time, the corresponding representative edge is associated with a second performance time, and the first performance time is greater than the second performance time.

9. The computer-implemented method of claim 1, wherein the modified first user workflow comprises a plurality of edges, and further comprising:

receiving from a client device, via the user interface, a user selection of a first edge included in the modified first user workflow;

retrieving edge information associated with the first edge; and causing the edge information to be displayed, at the client device, via the user interface.

10. The computer-implemented method of claim 9, wherein the edge information comprises at least one of compiled metrics, command data, and a screen recording associated with a user technique represented by the first edge.

11. One or more non-transitory computer-readable media including instructions that, when executed by one or more processors, cause the one or more processors to perform the steps of:

receiving a selection of a first task that is performed via a design application;

executing, on a first node of a first user workflow for performing the first task and a second node of a first workflow graph that graphically represents a plurality of user workflows for performing the first task, a trained autoencoder to generate a first vector comprising a compact representation of three-dimensional (3D) data associated with the first node and a second vector comprising a compact representation of 3D data associated with the second node;

determining, via the trained autoencoder, that the first node and the second node are similar based on a comparison between the first vector and the second vector;

subsequent to determining that the first node and the second node are similar, determining that a first edge associated with the first node should be modified based on a comparison between a feature of the first edge and a similar feature of a second edge associated with the second node;

generating a modified first user workflow based on a modification to the first edge; and causing the modified first user workflow to be displayed via a user interface.

12. The one or more non-transitory computer-readable media of claim 11, wherein:

the first task comprises modeling a first object; and the modified first user workflow comprises a sequence of edges and nodes, each node in the modified first user workflow representing a state of the modeling of the first object.

13. The one or more non-transitory computer-readable media of claim 11, wherein:

the first workflow graph comprises a plurality of representative workflows including a primary representative workflow, the primary representative workflow having a lowest number of total invoked commands relative to all other representative workflows included in the plurality of representative workflows;

the first user workflow comprises a plurality of edges representing a plurality of user techniques; and the modified first user workflow comprises a modified version of the first user workflow and includes a first highlighted edge that represents a first user technique that has been determined to be less efficient than all other user techniques included in the plurality of user techniques based on a comparison between the first user workflow and the primary representative workflow.

14. The one or more non-transitory computer-readable media of claim 11, wherein:

the first user workflow comprises a plurality of edges representing a plurality of user techniques;

the first workflow graph includes a primary representative workflow comprising a plurality of representative edges representing a plurality of user techniques, each representative edge in the primary representative workflow corresponding to an edge in the first user workflow; and the modified first user workflow comprises a modified version of the first user workflow and includes a first highlighted edge that represents a first user technique that has been determined to be less efficient than a corresponding user technique represented by a corresponding representative edge in the primary representative workflow.

15. The one or more non-transitory computer-readable media of claim 14, wherein:

the first workflow graph comprises a plurality of representative workflows; and the primary representative workflow has a lowest number of total invoked commands relative to all other representative workflows included in the plurality of representative workflows.

16. The one or more non-transitory computer-readable media of claim 11, wherein:

the first user workflow comprises a plurality of edges representing a plurality of user techniques; and the modified first user workflow comprises a modified version of the first user workflow comprising a first highlighted edge determined to represent a first user technique comprising a least efficient user technique in the plurality of user techniques based on a comparison between the first user workflow and the first workflow graph.

17. The one or more non-transitory computer-readable media of claim 16, wherein the first highlighted edge is determined to represent the least efficient user technique in the plurality of user techniques based on a total number of invoked commands associated with the first user technique.

18. The one or more non-transitory computer-readable media of claim 16, wherein the first highlighted edge is determined to represent the least efficient user technique in the plurality of user techniques based on a total performance time associated with the first user technique.

19. The one or more non-transitory computer-readable media of claim 11, wherein the modified first user workflow comprises a plurality of edges, further comprising the steps of:

receiving from a client device, via the user interface, a user selection of a first edge included in the modified first user workflow;

retrieving edge information associated with the first edge; and causing the edge information to be displayed, at the client device, via the user interface.

20. A computing system comprising:

one or more memories that includes instructions; and one or more processors that are coupled to the one or more memories and, upon executing the instructions, perform the steps of:

receiving a selection of a first task that is performed via a design application;

executing, on a first node of a first user workflow for performing the first task and a second node of a first workflow graph that graphically represents a plurality of user workflows for performing the first task, a trained autoencoder to generate a first vector comprising a compact representation of three-dimensional (3D) data associated with the first node and a second vector comprising a compact representation of 3D data associated with the second node;

determining, via the trained autoencoder, that the first node and the second node are similar based on a comparison between the first vector and the second vector;

subsequent to determining that the first node and the second node are similar, determining that a first edge associated with the first node should be modified based on a comparison between a feature of the first edge and a similar feature of a second edge associated with the second node;

generating a modified first user workflow based on a modification to the first edge; and causing the modified first user workflow to be displayed via a user interface.

* * * * *